United States Patent
Paschall, II et al.

(10) Patent No.: US 11,014,238 B2
(45) Date of Patent: May 25, 2021

(54) DYNAMIC NAVIGATION OF AUTONOMOUS VEHICLE WITH SAFETY INFRASTRUCTURE

(71) Applicant: Amazon Technologies, Inc., Seattle, WA (US)

(72) Inventors: Stephen Charles Paschall, II, Cambridge, MA (US); Justin Croyle, Hampstead, NH (US); Shilpi Gupta, Somerville, MA (US); Anatoly Mitlin, Swampscott, MA (US); Ashish Shah, Lincoln, MA (US)

(73) Assignee: Amazon Technologies, Inc., Seattle, WA (US)

( * ) Notice: Subject to any disclaimer, the term of this patent is extended or adjusted under 35 U.S.C. 154(b) by 529 days.

(21) Appl. No.: 15/823,069

(22) Filed: Nov. 27, 2017

(65) Prior Publication Data
US 2019/0160675 A1 May 30, 2019

(51) Int. Cl.
*B25J 9/16* (2006.01)
*G05D 1/02* (2020.01)
(Continued)

(52) U.S. Cl.
CPC ......... *B25J 9/1666* (2013.01); *G05D 1/0088* (2013.01); *G05D 1/024* (2013.01);
(Continued)

(58) Field of Classification Search
CPC ... B25J 9/1666; G05D 1/0088; G05D 1/0214; G05D 1/024; G05D 1/0274; G05D 2201/0216; G08G 1/00
See application file for complete search history.

(56) References Cited

U.S. PATENT DOCUMENTS 8,280,547 B2 * 10/2012 D'Andrea ............... B66F 9/063
700/214
9,087,314 B2 7/2015 Hoffman et al.
(Continued)

FOREIGN PATENT DOCUMENTS

WO     2017050358       3/2017
WO     WO-2017050358 A1 *  3/2017 ........... G05D 1/0214

OTHER PUBLICATIONS

U.S. Appl. No. 15/822,993, filed Nov. 27, 2017, Titled: Collision Prevention for Autonomous Vehicles.
(Continued)

*Primary Examiner* — Thomas E Worden
(74) *Attorney, Agent, or Firm* — Kilpatrick Townsend & Stockton LLP

(57) ABSTRACT

Disclosed autonomous mobile robot systems can be used to safely and efficiently navigate through a facility while avoiding objects in the path of the autonomous mobile robot during completion of a task. Specifically, a first bounded area based on first sensor data may be generated around an autonomous mobile robot where the first sensor data is used to identify objects in a travel path for the autonomous mobile robot and determine a speed for navigating the facility. A second bounded area of a size less than the first bounded area may be generated around the autonomous mobile robot based on speed information from propulsion components of the autonomous mobile robot. A new travel path and new speed information may be generated based on identifying an object in the travel path, dimensional measurements of a space around the object, and a current size of the second bounded area.

5 Claims, 15 Drawing Sheets

(51) Int. Cl.
  *G05D 1/00*  (2006.01)
  *G08G 1/00*  (2006.01)
(52) U.S. Cl.
  CPC ......... *G05D 1/0214* (2013.01); *G05D 1/0274* (2013.01); *G08G 1/00* (2013.01); *G05D 2201/0216* (2013.01)

(56) References Cited

U.S. PATENT DOCUMENTS

| | | | |
|---|---|---|---|
| 9,714,139 B1* | 7/2017 | Aggarwal | B64C 39/024 |
| 2005/0240317 A1* | 10/2005 | Kienzle-Lietl | G01G 9/00 |
| | | | 700/303 |
| 2011/0060449 A1 | 3/2011 | Wurman et al. | |
| 2012/0143427 A1* | 6/2012 | Hoffman | G06Q 10/08 |
| | | | 701/23 |
| 2016/0050397 A1* | 2/2016 | Di Giamberardino | ...................... |
| | | | H04N 5/2252 |
| | | | 315/149 |
| 2016/0335892 A1* | 11/2016 | Okada | B60W 30/0956 |
| 2019/0202388 A1* | 7/2019 | Sonoura | G06Q 10/08 |

OTHER PUBLICATIONS

"Operating Instructions S300", Available online at URL:https://cdn.sick.com/media/docs/3/13/613/Operating_Instructions_S300_Safety_laser scanner_en_IM0017613. PDF, Feb. 17, 2016, 148 pages.
PCT/US2018/062030 , "International Search Report and Written Opinion", dated Mar. 1, 2019, 15 pages.

* cited by examiner

DYNAMIC NAVIGATION OF AUTONOMOUS VEHICLE WITH SAFETY INFRASTRUCTURE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Particular safety issues may rise when dealing with an automated or semi-automated inventory system that utilizes unmanned vehicles to perform tasks that create further inefficiencies. For example, unmanned vehicles performing tasks in an automated inventory system may cease moving or stop performing their assigned task upon detecting an object or coming across an obstacle in their path. Other solutions to increase efficiency of the unmanned vehicles may pose safety concerns that are unacceptable for persons working in a facility alongside the unmanned vehicles.

BRIEF DESCRIPTION OF THE DRAWINGS

Various embodiments in accordance with the present disclosure will be described with reference to the drawings, in which.

DETAILED DESCRIPTION

Figure 1:
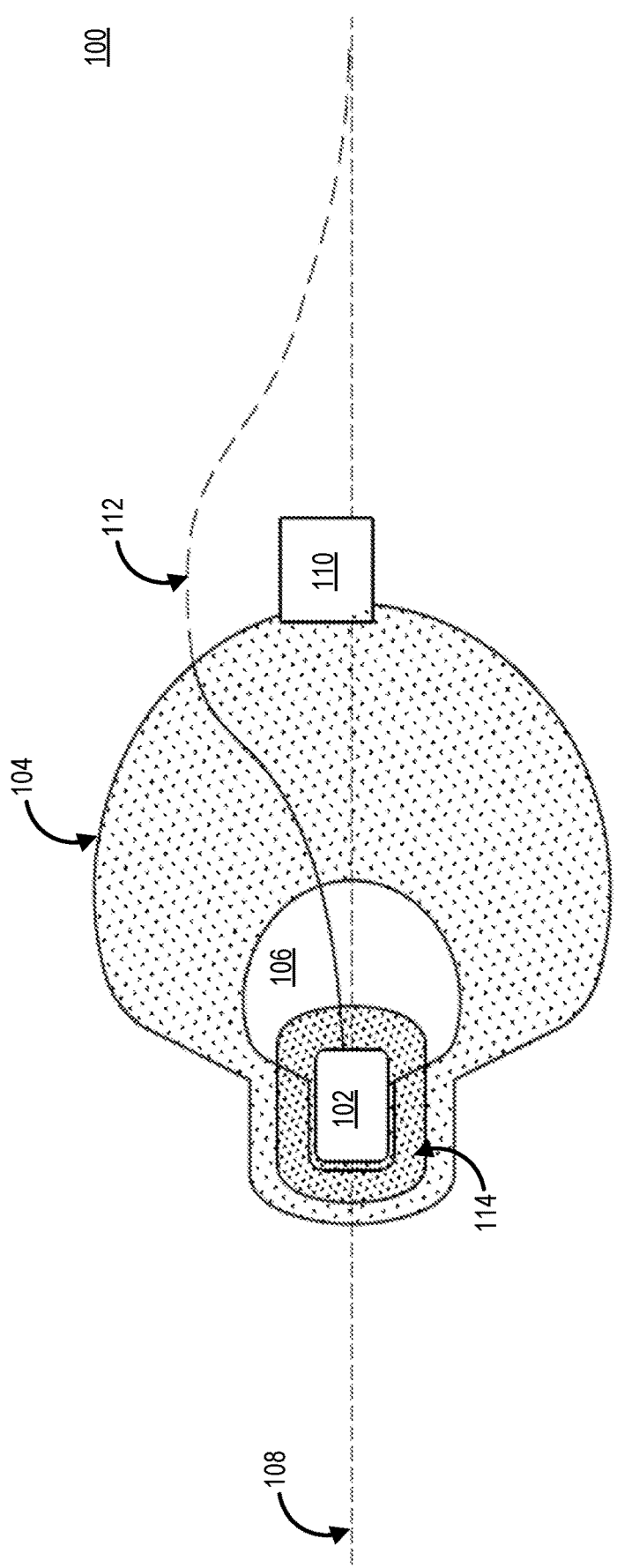
FIG. 1 illustrates an example collision prevention feature for an autonomous mobile robot, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to preventing collisions between autonomous mobile robots operating in a facility, workspace, or inventory management system that includes other autonomous mobile robots performing tasks as well as persons operating within the same space. Specifically, an autonomous mobile robot may include a navigation system for independently identifying efficient and safe routes to complete a task within a facility/workspace and a certified safety verification system for overriding instructions to propulsion components of the autonomous mobile robot when the routes may place the autonomous mobile robot at risk of a collision. As the autonomous mobile robot includes two separate but interacting systems the navigation system is configured to perform a task, with a same start and end location, multiple times utilizing a different route each time based on which route is most efficient in the moment. Independent on input from fleet management computers of an inventory management system, the autonomous mobile robot and navigation system is configured to dynamically re-plan its route to avoid unexpected obstacles such as pallets, carts, or people while navigating a facility or workspace to complete a task. In embodiments, during the course of navigating a facility or workspace, the autonomous mobile robot may encounter unexpected static/stationary or mobile/dynamic obstacles, including human bystanders, which require the autonomous mobile robot to safely and efficiently negotiate around the obstacle to complete its task.

Embodiments of a collision prevention feature disclosed herein include advantages from conventional autonomous vehicle systems operating in a workspace. For example, primary hazards posed to autonomous mobile robots revolve around vehicle movement and payload manipulation during direct and frequent exposure to humans and/or other autonomous mobile robots. During movement, an autonomous mobile robot may strike a person leading to a collision or crush scenario, and/or the payload could become dislodged or fall from the autonomous mobile robot creating a payload collision or crush hazard. Conventional systems for avoiding collision or crush hazards include identifying an object such as a person within a certain distance of the autonomous mobile vehicle and ceasing propulsion or movement of the vehicle until the object has moved away a certain distance without any re-routing of the vehicle upon identifying the object. However, the collision prevention features disclosed herein provide improvements over conventional systems by utilizing a navigation system that identifies a space and a speed that is appropriate to utilize in a re-routing scenario that includes moving past or around a detected object with a certified safety failsafe to cease propulsion upon the object breaching a safe zone around the autonomous mobile robot. As such, the navigation computer of the autonomous mobile robot is enabled and configured to generate and attempt multiple routes to navigate past a detected object and continue on a mission to complete a task using sensor data from sensors associated with the autonomous mobile robot. The autonomous mobile robot can attempt these routes with the assurance that if the object acts erratically (i.e., moves directly into the path of the oncoming autonomous mobile robot) or the selected route and speed result in the autonomous mobile robot moving too close to the object, the safety verification system will provide instructions to propulsion mechanisms that will override any steering and/or propulsion instructions from the navigation system and cause the autonomous mobile robot to cease moving.

In embodiments, a stationary object includes a permanent building feature like a structural column, a movable object such as a box or parked vehicle, or a stationary human that's unware of the approaching autonomous mobile robot. Dynamic or non-stationary objects could include walking humans, manually driven vehicles, manually pulled/pushed carts, or other autonomous mobile robots. The safety verification system utilizes sensors associated with the autonomous mobile robot to ensure safety from collision and crush hazards as the autonomous mobile robot operates efficiently near humans in a dynamic environment. In accordance with at least one embodiment, an autonomous mobile robot may include a navigation system or navigation computer that utilizes a first set of sensors and/or obstacle detection sensors to generate and maintain a local planning zone around an autonomous mobile robot. The obstacle detection sensors are configured to detect an object or obstruction in a path of the autonomous mobile robot as it navigates through a facility or workspace to complete a task. Further, the navigation system is configured to utilize the data captured by the obstacle detection sensors to generate new routes or path to navigate the facility/workspace while completing a task.

The new routes or paths may include instructions for changing a current speed, direction, or steering for the autonomous mobile robot to utilize to avoid and navigate past a detected object or obstacle. The autonomous mobile robot may include a separate safety verification system that utilizes one or more safety sensors to generate and maintain a safe zone around the autonomous mobile robot as it navigates a facility or workspace. The safety verification system is configured to veto instructions from the navigation system to a motor controller and/or propulsion mechanisms of the autonomous mobile robot upon identifying an object/obstacle has breached the safe zone around the autonomous mobile robot. In embodiments, the safety verification system dynamically updates the size and shape of the safety zone around the autonomous mobile robot based at least in part on the speed of the propulsion mechanisms such that the safety zone adjusts to enable the navigation computer to generate and attempt routes that navigate past congested areas or multiple objects. The navigation computer system may utilize the size of the safety zone to identify an appropriate speed for navigating past a detected object/obstacle such that a feedback loop exists between the navigation computer and safety computer that results in a dynamic route generating and safety verification for the autonomous mobile robot to utilize to avoid collisions while navigating the facility/workspace.

FIG. 1 illustrates an example collision prevention feature for an autonomous mobile robot, in accordance with at least one embodiment. The diagram 100 of FIG. 1 depicts an autonomous mobile robot 102 with a local planning zone 104 and a safety zone 106. In accordance with at least one embodiment, the local planning zone 104 is generated and maintained by a navigation system of the autonomous mobile robot 102 using associated obstacle detection sensors. The local planning zone 104 is configured such that the obstacle detection sensors can identify obstacles and is also utilized in the route planning for the autonomous mobile robot 102 to navigate a facility to complete a task. The obstacle detection sensors limit the shape and size of the local planning zone 104 according to their range capability or horizon. FIG. 1 also include a global path plan 108 that represents general guidance provided by a fleet management computer for completing a task within a facility. In embodiments, the global path plan 108 may represent a default path or route for the autonomous mobile robot to utilize to complete a task.

The diagram 100 also illustrates a detected object 110 within the current path (global path plan 108) as detected by the object detection sensors associated with the local planning zone 104. In embodiments, the safety zone 106 is generated and maintained by the autonomous mobile robot 102 and a safety verification system using one or more safety sensors to identify obstacles or obstructions within a certain distance of the autonomous mobile robot. In embodiments, the safety verification system, along with the safety zone 106, is configured to provide instructions that command the autonomous mobile robot 102 to cease moving upon identifying an object or obstacle within the safety zone 106. The size and shape of the safety zone 106 is determined based at least in part on current speed of the autonomous mobile robot 102 which in turn is determined by the navigation computer of the autonomous mobile robot. In accordance with at least one embodiment, the navigation computer system independently controls the speed and direction of the autonomous mobile robot 102 while generating a new local plan or local obstacle avoidance plan 112 but considers the safety zone 106 size and shape when generating the new local plan 112.

Thus, the navigation system and safety verification system implement a feedback system that enables the navigation system to generate the new local plan 112 to avoid colliding with the detected obstacle 110 while having a failsafe of the safety verification system. If the obstacle 110 moves or the instructions cause the autonomous mobile robot 102 to move within a certain distance of the obstacle 110 which causes the obstacle to breach the safety zone 106, then the safety verification system would override or veto any instructions from the navigation computer to propulsion mechanisms of the autonomous mobile robot 102 to cease propulsion and safely stop the autonomous mobile robot 102. The separation of the navigation computer and safety verification computer allows a high-performance, complex, non-safety certified autonomous navigation capability for the autonomous mobile robot 102 to operate the navigation and collision avoidance tasks while relying on a simpler safety verification monitor to ensure safety. In embodiments, the navigation system, while performing obstacle detection and avoidance, considers the size of the autonomous mobile robot 102, the size of the safety zone 106, and the physical dimensions around the detected obstacle 110 to identify a route that enables the autonomous mobile robot 102 to fit between obstacle as it travels according to the new local plan 112.

The diagram 100 also depicts a buffer zone or hazard zone 114 around the autonomous mobile robot 102. The buffer zone 114 may be increased based on the physical dimensions associated with a payload that the autonomous mobile robot is moving through the facility. The buffer zone 114 may be generated and maintained by the safety verification system and utilize safety sensors or separate sensors to detect breaches of the buffer zone 114. When the autonomous mobile robot 102 is operating within a space that causes obstacles to breach the buffer zone 114, the safety verification system enforces a minimal speed for the autonomous mobile robot 102 to utilize and also generates a signal such as an audible warning, a visible warning (e.g., an update to a user interface associated with the autonomous mobile robot 102 or a user interface of a computing device of a user and/or associated with a facility) regarding the breach of the buffer zone 114. An example of the minimal speed may be 0.3 m/s (miles per second). An example size of the buffer zone may be 0.5 meters around the autonomous mobile robot 102.

Figure 2:
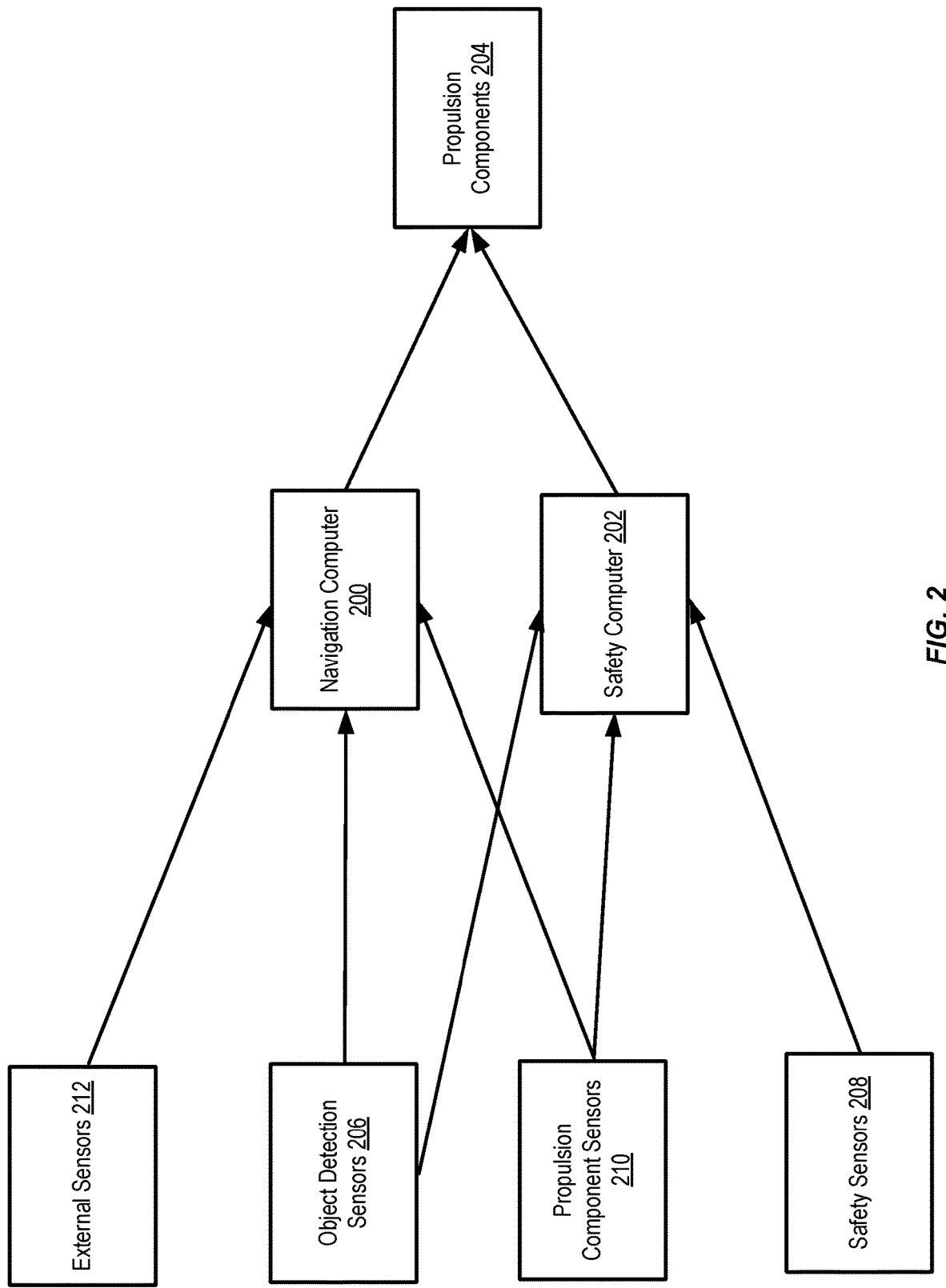
FIG. 2 illustrates example components of an autonomous mobile robot for implementing the collision prevention feature, in accordance with at least one embodiment.

FIG. 2 illustrates example components of an autonomous mobile robot for implementing the collision prevention feature, in accordance with at least one embodiment. The components of FIG. 2 includes a navigation computer 200, a safety computer 202, propulsion components 204, object detection sensors 206, safety sensors 208, propulsion component sensors 210, and external sensors 212. In accordance with at least one embodiment, an autonomous mobile robot may include the components 200-212 of FIG. 2. As illustrated, the navigation computer 200 is independent of the safety computer 202 but both are in communication with the propulsion components 204. As described herein, the object detection sensors 206 are configured to detect objects or obstacles and capture data that is utilized by the navigation computer 200 to generate a local travel path or plan. In embodiments, as illustrated by FIG. 2, the safety computer 202 may also utilize data captured by the object detection sensors 206 in generating and maintain a safety zone around the autonomous mobile robot. In accordance with at least one embodiment, the propulsion components sensors 210 may be configured to provide speed information or information identifying a current speed of the propulsion components 204.

In accordance with at least one embodiment, the safety sensors 208 may be configured to capture data that identifies a breach in a safety zone around the autonomous mobile robot that is generated by the safety computer 202 and based at least in part on the speed information from the propulsion components sensors 210. In embodiments, the navigation computer 200 may receive or utilize information from one or more external sensors 212 (i.e., sensors not operatively attached but in communication with the autonomous mobile robot). For example, a facility or workspace may include a number of sensors similar to the object detection sensors 206 that capture sensor data and wirelessly communicate the data to the navigation computer 200 for local route planning and object detection. As described herein, the navigation computer 200 independent controls the speed of the autonomous mobile robot but considered the safety zone size and shape generated by the safety computer 202 which follows a known relationship with the speed of the propulsion components 204 as identified by the propulsion component sensors 210.

With this configuration, the navigation computer 200 can optimize path and velocity plans given the detected obstacles detected by the obstacle detection sensors 206. For example, the navigation computer 200 would evaluate a minimum time to complete a task comparing a direct route through tight clutter or multiple obstacles (that would mandate slow speeds to fit the safety zone generated by the safety computer 202) versus a longer, more open route around the clutter or multiple obstacles (which would allow for faster speeds). This configuration of components enables the navigation computer 200 to utilize sophisticated algorithms to generate complex navigation paths in a given environment. For example, the navigation computer 200 might attempt to identify objects as humans and estimate their direction and speed of travel using the data captured by the object detection sensors 206 and/or external sensors 212 to better plan the autonomous mobile robots trajectory accounting for the human obstacles and their potential future locations. The complex algorithms utilized by the navigation computer 200 may be prone to confusion or error and will fail to give correct results. However, the safety computer 202 services as a highly reliable failsafe to the navigation computer 200 that vetoes or overrides the speed and direction instructions to the propulsion components 204 thereby allowing the navigation computer 200 to fail without having any impact on the safety of the autonomous mobile robot or nearby bystanders. In accordance with at least one embodiment, the safety computer 202 may monitor the health and status of the navigation computer 200 to identify any malfunctions or failures to respond. Periodic pings or information requests may be provided by the safety computer 202 to the navigation computer 200 whose data can be utilized by the safety computer 202 to identify a malfunction or error and trigger a safe stop of the autonomous mobile robot by providing instructions to the propulsion components 204.

Figure 3:
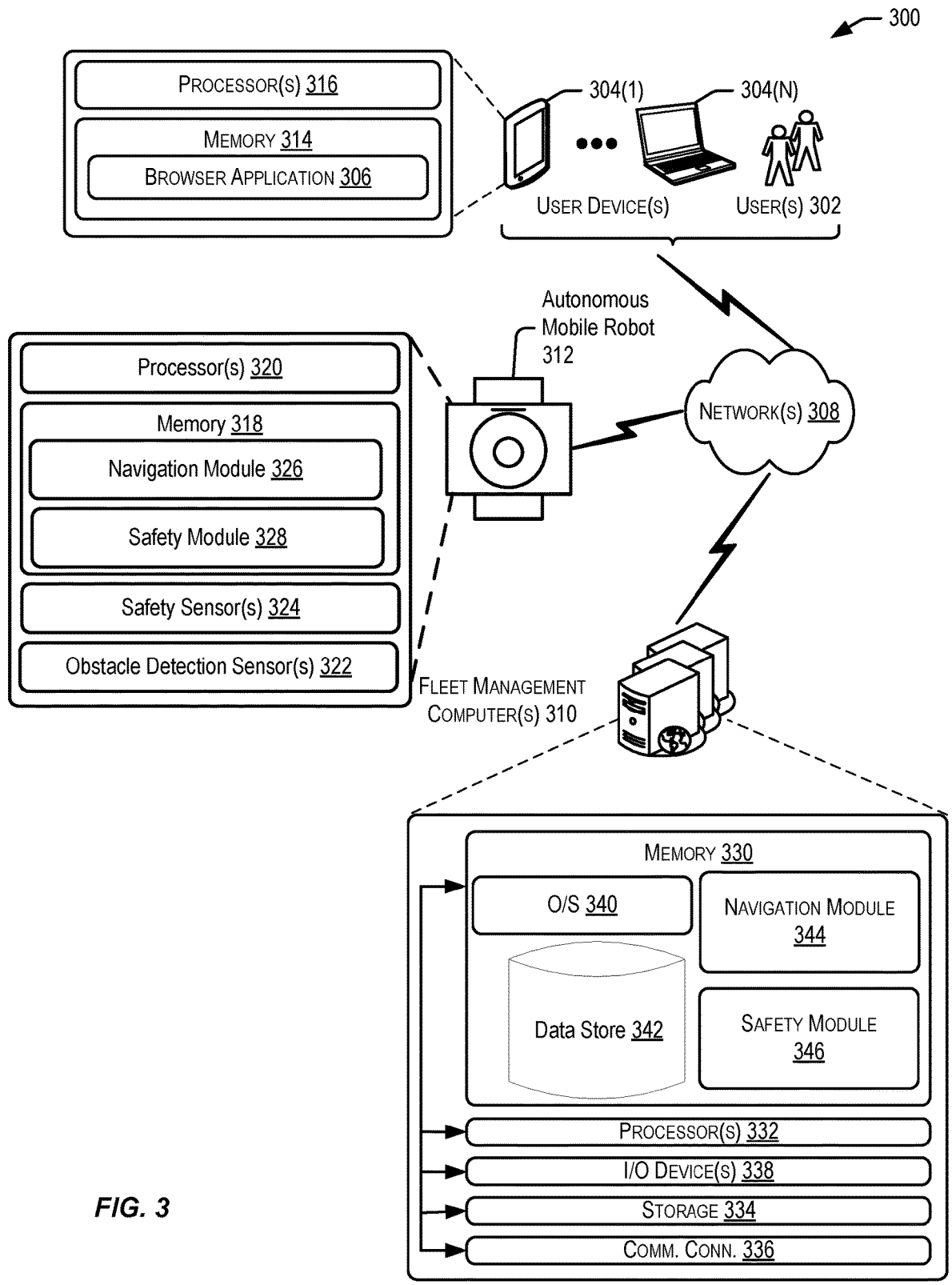
FIG. 3 illustrates an example architecture for a collision prevention feature that includes one or more fleet management computers, a user device, and an autonomous mobile robot, in accordance with at least one embodiment.

FIG. 3 illustrates an example architecture for a collision prevention feature that includes one or more fleet management computers, a user device, and an autonomous mobile robot, in accordance with at least one embodiment. In architecture 300, one or more users 302 (e.g., inventory management system administrators or working entities associated with the inventory management system) may utilize user computing devices 304(1)-(N) (collectively, user devices 304) to access a browser application 306 or a user interface (UI) accessible through the browser application 306, via one or more networks 308 to request access to information about the inventory management system and/or materials handling facility, and one or more autonomous mobile robots navigating the facility or workspace from the fleet management computers 310 and/or from the autonomous mobile robot 312. The "browser application" 306 can be any browser control or native application that can access and display a network page or other information. A native application may include an application or program that has been developed for use on a particular platform (such as an operating system) or a particular device (such as a particular type of mobile device).

In accordance with at least one embodiment, the user devices 304 may be configured for communicating with an autonomous mobile robot 312 via networks 308. In embodiments, the user device 304 may include a dedicated device or a wearable device. The dedicated or wearable devices may include memory and processors similar to the memory 314 and processors 316 of the user devices 304.

The architecture 300 may also include an autonomous mobile robot 312 that may be configured to move/navigate within the inventory management system, facility, or workspace and slow down, navigate or steer around detected objects in a travel path, or stop in response to sensor information from one or more sensors associated with the autonomous mobile robot 312. In embodiments, the autonomous mobile robot 312 may be an example of an autonomous mobile robot as described herein. The autonomous mobile robot 312 may include at least one memory 318 and one or more processing units or processor(s) 320. The memory 318 may store program instructions that are loadable and executable on the processor(s) 320, as well as data generated during the execution of these programs. Depending on the configuration and type of autonomous mobile robot 312, the memory 318 may be volatile (such as random access memory (RAM)) and/or non-volatile (such as read-only memory (ROM), flash memory, etc.). The autonomous mobile robot 312 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the autonomous mobile robot 312. In some implementations, the memory 318 may include multiple different types of memory, such as static random access memory (SRAM), dynamic random access memory (DRAM), or ROM. In embodiments, the autonomous mobile robot 312 may include one or more sensors such as obstacle detection sensors 322 and safety sensors 324.

In an embodiment, the obstacle detection sensors 322 may be configured to identify or detect an object or obstacle within a certain distance of the autonomous mobile robot 312 up to the sensors capabilities. In accordance with at least one embodiment, the obstacle detection sensors 322 may include one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning light detection and ranging (LIDAR) sensor or other suitable light pulse laser ranging sensors; and/or three dimensional imagers such as the LIDAR sensor, a solid-state LIDAR, a time-of-flight camera(s), stereo cameras both active and passive, structured light cameras, or radio detection and ranging (Radar) transmitters and receivers. In accordance with at least one embodiment, the safety sensors 324 can include one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning light detection and ranging (LIDAR) sensor or other suitable light pulse laser ranging sensors; and/or three dimensional imagers such as the LIDAR sensor, a solid-state LIDAR, a time-of-flight camera(s), stereo cameras both active and passive, structured light cameras, or radio detection and ranging (Radar) transmitters and receivers. In some embodiments, the autonomous mobile robot 312 may be in communication with one or more sensors that are external (not associated with or operatively attached to the autonomous mobile robot 312) that are located throughout an inventory management system, facility, and/or workspace.

Turning to the contents of the memory 318 in more detail, the memory 318 may include an operating system and one or more application programs or services for implementing the features disclosed herein. Additionally, the memory 318 may include an autonomous mobile robot 312 may include a navigation module 326 and a safety module 328. In embodiments, the navigation module 326 may be configured to generate and maintain a local planning zone or first bounded area around the autonomous mobile robot 312. The local planning zone or first bounded area may be projected from the autonomous mobile robot 312 in a direction or facing of the autonomous mobile robot 312 (i.e., front facing direction). The navigation module 326 may be configured, using the obstacle detection sensors 322, to identify or detect an obstacle within the local planning zone. For example, the navigation module 326 may generate a local planning zone of a size that corresponds to the obstacle detection sensors 322 capabilities and identify when an object has penetrated the local planning zone derived from the sensor data captured by the obstacle detection sensors 322. In some embodiments, the navigation module 326, using the data captured by the obstacle detection sensors 322, may identify a surface composition for a surface within a facility or workspace, such as by identifying a wet surface versus a dry surface. In an embodiment, the navigation module 326, using the data captured by the obstacle detection sensors 322, may identify a gap or door between one or more walls/barriers of the facility or workspace. In embodiments, the navigation module 326, using the sensor data captured by the obstacle detection sensors 322, be configured to identify physical dimensions or space around a detected object or obstacle within the local travel plan and local planning zone. For example, the navigation module 326 may be configured to identify the space between the detected object/obstacle and a wall of the facility or workspace to compare to a known size of the autonomous mobile robot 312 and determine if the autonomous mobile robot can navigate around or by the obstacle/obstruction at a slower speed to efficiently complete the assigned task.

In accordance with at least one embodiment, the navigation module 326 may be configured to generate a local travel plan or path for completing a task within the inventory management system, facility, or workspace. The local travel plan or path may include instructions for steering and a speed to utilize for one or more propulsion components of the autonomous mobile robot 312. In embodiments, the navigation module 326 may utilize the sensor data from the obstacle detection sensors 322 to generate a new travel plan that includes avoiding or navigating around an obstacle or obstruction that is within the local planning zone and the current local travel plan. The new travel plan may include instructions to the propulsion mechanisms of the autonomous mobile robot 312 for updating a steering, direction, and speed for the autonomous mobile robot 312 to utilize while navigating the facility or workspace to complete a task. In some embodiments, the new travel plan may include instructions for centering the autonomous mobile robot 312 between the identified physical dimensions around the object and a wall or barrier of the facility or workspace. In accordance with at least one embodiment, the new travel plan may include instructions for centering the autonomous mobile robot 312 between the identified object/obstacle in the local planning zone according to a distance of a safety zone around the autonomous mobile robot 312. In embodiments, the navigation module 326 may be configured to identify whether an object is stationary or mobile (not stationary) as well as directionality and speed of the object if it is mobile using the sensor data captured by the navigation module 326.

In accordance with at least one embodiment, the safety module 328 may be configured to generate and maintain a safety zone around the autonomous mobile robot 312 using data captured by the safety sensors 324. In embodiments, the safety sensors 324 may be configured to capture data up to a certain distance around the autonomous mobile robot 312 that is less than the distance captured by the obstacle detection sensors 322. In embodiments, the obstacle detection sensors 322 and safety sensors 324 may be redundant sensors of the same type, number, and/or configuration. In accordance with at least one embodiment, the size of the safety zone may be less than that of the local planning zone generated by the navigation module 326. The safety module 328 may be configured to identify or detect an object or obstacle penetrating the safety zone based on the data captured by the safety sensors 324 and provide instructions to a motor controller and/or propulsion mechanisms of the autonomous mobile robot 312 which cease propulsion of the autonomous mobile robot 312. In accordance with at least one embodiment, the safety module 328 may dynamically update the size of the safety zone based on speed information obtained from the motor controller and/or propulsion mechanisms of the autonomous mobile robot 312. By updating the size of the safety zone, the safety module 328 provides a certified fail safe for the navigation module 328 and the local planning paths that it generates to avoid obstacles or objects in the facility. The autonomous mobile robot 312 is able to travel, albeit at a slower speed, past crowded, congested, or otherwise non-clear paths of the facility workspace as the navigation module 326 provides updated travel paths based on data from the obstacle detection sensors 322 with a failsafe provided by the safety module 328 that overrides any propulsion or steering that results in the object or obstacle penetrating the safety zone. The safety module 328 is also able to respond to objects that move unexpectedly into the path of the autonomous mobile robot 312 by detecting the object penetrating the safety zone and providing instructions to the propulsion mechanisms and cease propulsion of the autonomous mobile robot 312. For example, a person opening a closed door and stepping directly into the path of the autonomous mobile robot 312 from a blind spot.

The autonomous mobile robot 312 may also include geo-location devices (e.g., a global positioning system (GPS) device or the like) for providing and/or recording geographic location information associated with the autonomous mobile robot 312 and comparing the information maintained by the fleet management computers 310. In embodiments, the autonomous mobile robot 312 may also utilize other sensor technologies for determining location information such as imaging devices, scanners, radio frequency identification (RFID) readers that are configured to read fiducial markings, barcodes, RFID tags, or other identifiers from the surrounding environment (such as markings or identifiers located on inventory holders, walls, barriers, or other surfaces of an inventory management system, facility, or workspace) to determine their own location and/or enter one or more modes that are described in further detail with reference to FIGS. 7-10.

The architecture 300 may also include one or more fleet management computers 310 that may, in some examples, provide computing resources such as, but not limited to, client entities, low latency data storage, durable data storage, data access, management, virtualization, hosted computing environment or "cloud-based" solutions, electronic content performance management, etc. The fleet management computers 310 may also be operable to provide site hosting, computer application development, and/or implementation platforms, combinations of the foregoing, or the like to the one or more users 302 via user devices 304 and/or provide access to the autonomous mobile robot 312.

In some examples, the networks 308 may include any one or a combination of many different types of networks, such as cable networks, the Internet, wireless networks, cellular networks and other private and/or public networks. While the illustrated example represents the users 302 and autonomous mobile robot 312 communicating with the fleet management computers 310 over the networks 308, the described techniques may equally apply in instances where the users 302 interact with the fleet management computers 310 via the one or more user devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The fleet management computers 310 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the fleet management computers 310 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the fleet management computers 310 may be in communication with the user device 304 and autonomous mobile robot 312 via the networks 308, or via other network connections. The fleet management computers 310 may include one or more servers, perhaps arranged in a cluster or as individual servers not associated with one another.

In one illustrative configuration, the fleet management computers 310 may include at least one memory 330 and one or more processing units or processors(s) 332. The processor(s) 332 may be implemented as appropriate in hardware, computer-executable instructions, firmware, or combinations thereof. Computer-executable instruction or firmware implementations of the processor(s) 332 may include computer-executable or machine-executable instructions written in any suitable programming language to perform the various functions described when executed by a hardware computing device, such as a processor. The memory 330 may store program instructions that are loadable and executable on the processor(s) 332, as well as data generated during the execution of these programs. Depending on the configuration and type of the fleet management computers 310, the memory 330 may be volatile (such as RAM) and/or non-volatile (such as ROM, flash memory, etc.). The fleet management computers 310 or servers may also include additional storage 334, which may include removable storage and/or non-removable storage. The additional storage 334 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 330 may include multiple different types of memory, such as SRAM, DRAM, or ROM.

The memory 330, the additional storage 334, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 330 and the additional storage 334 are all examples of non-transitory computer storage media. Additional types of non-transitory computer storage media that may be present in the fleet management computers 310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the fleet management computers 310. Combinations of any of the above should also be included within the scope of non-transitory computer-readable media.

The fleet management computers 310 may also contain communication connection interface(s) 336 that allow the fleet management computers 310 to communicate with a data store, another computing device or server, user terminals and/or other devices on the networks 308. The fleet management computers 310 may also include I/O device(s) 338, such as a keyboard, a mouse, a pen, a voice input device, a touch input device, a display, speakers, a printer, etc.

Turning to the contents of the memory 330 in more detail, the memory 330 may include an operating system 340, one or more data stores 342, and/or one or more application programs or services for implementing the features disclosed herein including the navigation module 344 and safety module 346. In accordance with at least one embodiment, the navigation module 344 and safety module 346 may be configured to perform operations similar to those described with reference to navigation module 326 and safety module 328.

In accordance with at least one embodiment, the collision prevention features implemented by the autonomous mobile robot 312 may be utilized in an inventory management system similar to the inventory systems disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS." An inventory management system may include the fleet management computers 310, one or more autonomous mobile robots 312, one or more inventory holders, one or more inventory stations, one or more areas identified as a cross walk or slow area, and an unbounded area outside of the inventory management system. In embodiments, the cross walk or slow area may be an area where autonomous mobile robots are restricted to moving a certain speed as the area is associated with a high amount of traffic by other autonomous mobile robots and/or humans moving throughout the facility or inventory management system.

The fleet management computers 310 may generate tasks for the autonomous mobile robots to transfer inventory or other items within the inventory management system using the inventory holders or otherwise interact with inventory stations. The autonomous mobile robots are capable of moving or transferring inventory items between locations within a facility or workspace to facilitate the entry, processing, and/or removal of inventory items from inventory holders or complete other tasks related to inventory items. The fleet management computers 310 may assigns tasks to appropriate components of inventory management system and coordinate operation of the various components in completing the tasks. These tasks may relate not only to the movement and processing of inventory items, but also to the management and maintenance of the components of inventory management system. For example, fleet management computers 310 may assign portions of a workspace or facility as parking spaces for autonomous mobile robots, the scheduled recharge or replacement of batteries for the autonomous mobile robots, the storage of empty inventory holders, usage of cross walk areas or slow areas, identity and location of autonomous mobile robots in the facility/workspace, or any other operations associated with the functionality supported by the fleet management computers 310 and its various components. Although FIG. 3 illustrates a single autonomous mobile robot 312, peer to peer communication between multiple autonomous mobile robots and/or the fleet management computers 310 may occur.

Autonomous mobile robot 312 may move inventory holders between locations within a workspace, facility, or an unbounded area. Autonomous mobile robot 312 may represent any devices or components appropriate for use in an inventory management system, facility, or workspace based on the characteristics and configuration of inventory holders, items, and/or other elements of inventory management system, facility, or workspace. The autonomous mobile robot 312 represents an independent, self-powered device configured to freely move about a workspace, facility, inventory management system, or unbounded area. Additionally, the autonomous mobile robot 312 may be capable of communicating with the fleet management computers 310 and/or other autonomous mobile robots to receive information identifying inventory holders, transmit the locations of autonomous mobile robots, or exchange any other suitable information to be used by the fleet management computers 310 or autonomous mobile robots 312 during operation. Autonomous mobile robot 312 may communicate with the fleet management computers 310 and other autonomous mobile robots wirelessly, using access points (not pictured) located within or about the workspace, facility, inventory management system, or unbounded area, and/or in any other appropriate manner. As one example, particular embodiments of the autonomous mobile robot 312 may communicate with the fleet management computer 310 and/or with one another using 802.11, Bluetooth, or Infrared Data Association (IrDA) standards, or any other appropriate wireless communication protocol via the access points. Inventory holders may store inventory items. In a particular embodiment, inventory holders may include multiple storage bins with each storage bin capable of holding one or more types of inventory items. Inventory holders may be capable of being carried, rolled, and/or otherwise moved by the autonomous mobile robot 312. A workspace, facility, or inventory management system may include a fixed, predetermined, and finite physical space, and particular embodiments of the collision prevention feature may include the autonomous mobile robot 312 being configured to operate within a workspace that is of variable dimensions and/or an arbitrary geometry such as unbounded area. A workspace, facility, or inventory management system may be entirely enclosed in a building, and alternative embodiments may utilize workspaces in which some or all of the workspace is located outdoors, within a vehicle (such as a cargo ship), or otherwise unconstrained by any fixed structure or associated with an unbounded area.

In operation, the fleet management computers 310 may select appropriate components to complete particular tasks and transmits task assignments to the selected components to trigger completion of the relevant tasks. Each task assignment defines one or more tasks to be completed by a particular component. These tasks may relate to the retrieval, storage, replenishment, and counting of inventory items and/or the management of the autonomous mobile robots, inventory holders, inventory stations, and other components of an inventory management system, workspace, or facility. Depending on the component and the task to be completed, a particular task assignment may identify locations, components, and/or actions associated with the corresponding task and/or any other appropriate information to be used by the relevant component in completing the assigned task.

In particular embodiments, the fleet management computers 310 generates task assignments based, in part, on inventory requests that the fleet management computers 310 receives from other components of an inventory management system and/or from external components in communication with the fleet management computers 310. These inventory requests identify particular operations to be completed involving inventory items stored or to be stored within an inventory management system, workspace, or facility and may represent communication of any suitable form. For example, in particular embodiments, an inventory request may represent a shipping order specifying particular inventory items that have been purchased by a customer and that are to be retrieved from an inventory management system for shipment to the customer. Upon an autonomous mobile robot 312 receiving a task, the autonomous mobile robot 312 may identify its own path or route to complete the task with no further communication from the fleet management computers 310.

As used herein, the phrase "access points" includes devices that act as transmitters and receivers of local area wireless network signals (e.g., "Wi-Fi", Long Term Evolution (LTE), Bluetooth, WirelessHD and WiGig, and Z-Wave). Location information may include an ID of the autonomous mobile robot 312, X, Y and Z coordinates of the autonomous mobile robot 312 in an inventory management system, a timestamp from when the autonomous mobile robot 312 that sent the information to the computer system, roam time between access points (the time period for the autonomous mobile robot unit to successfully switch from one access point to another within the inventory management system), received signal strength indicators, timeouts that occur when at least one autonomous mobile robot switches from one access point to another, beacons from the access points, and/or bitrates. As used herein, the phrase "autonomous mobile robot" may include a unit that is capable of moving within the inventory management system, facility, or workspace without human input and may include any appropriate components for propelling itself and navigating to a particular destination within the inventory management system, facility, or workspace. The autonomous mobile robot 312 may also be capable of gathering and sending information about the inventory management system's network connectivity. A mobile drive unit/AGV/drive unit may be a type of autonomous mobile robot, in particular, an autonomous ground vehicle.

In accordance with at least one embodiment, several portions of an inventory management system, workspace, or facility may be associated with a safe wall, barrier, or portion for use by the autonomous mobile robot 312. The safe wall or portion of the facility/workspace may be associated with a continuous wall or barrier that may allow for faster travel by the autonomous mobile robot 312 and disabling of a portion of the obstacle detection sensors 322 and safety sensors 324 as discussed with reference to FIGS. 7-10. The safe zones or portions may be identified through use of a fiducial marking that marks points on a two-dimensional grid that covers all or a portion of a workspace, facility, or inventory management system. In such embodiments, the obstacle detection sensors 322 may be configured to utilize a camera and suitable image- and/or video-processing components, such as an appropriately-programmed digital signal processor, to detect the fiducial marks within the camera's field of view. As a result, the navigation module 326 may utilize the fiducial marks to maintain an accurate indication of the location of a safe zone or portion of the workspace, facility, or inventory management system and utilize one or more modes for disabling a portion of the safety sensors 324 and/or obstacle detection sensors 322 and utilize different speed profiles which may result in a higher speed navigation through the facility or workspace.

Figure 4:
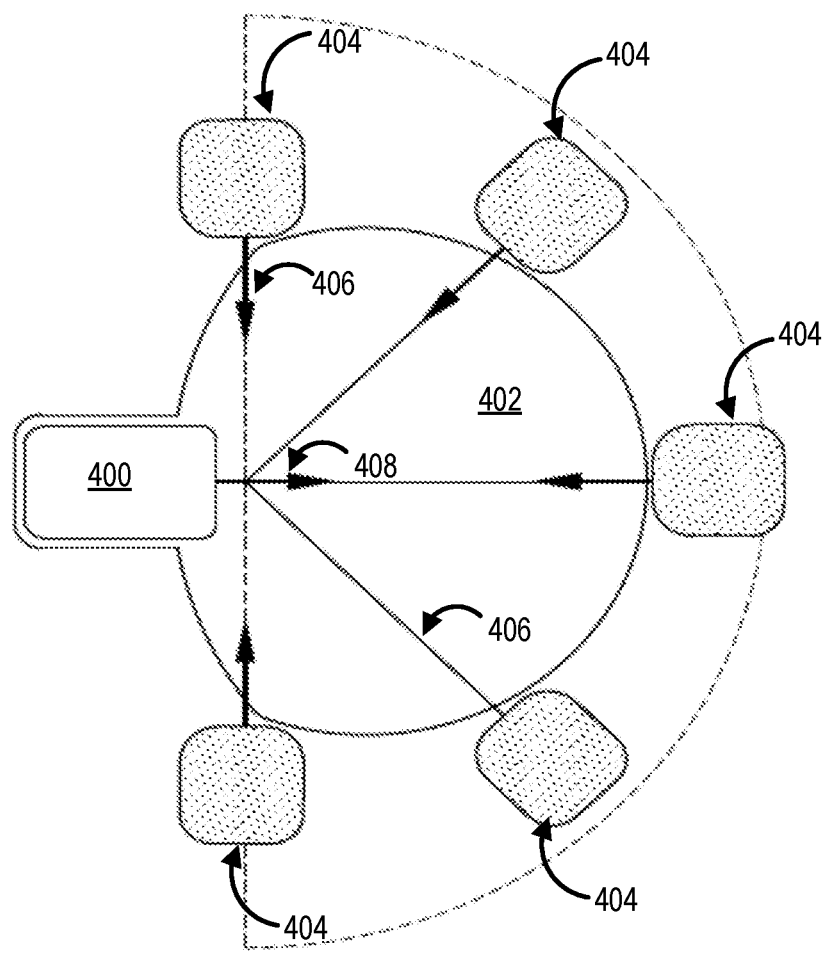
FIG. 4 illustrates an example assumption for the autonomous mobile robot implementing the collision prevention feature that includes one or more dynamic objects on a collision course with the autonomous mobile robot, in accordance with at least one embodiment.

FIG. 4 illustrates an example assumption for the autonomous mobile robot implementing the collision prevention feature that includes one or more dynamic objects on a collision course with the autonomous mobile robot, in accordance with at least one embodiment. FIG. 4 depicts an autonomous mobile robot 400 with a safety zone 402 and one or more incoming objects 404 (e.g., with a directionality 406 towards the autonomous mobile robot 400). The autonomous mobile robot 400 is moving in a forward direction 408 towards some of the incoming objects 404. FIG. 4 illustrates an example assumption which the safety computer utilizes when generating and maintain the safety zone 402—the assumption that one or more objects (404) are always on a direct path to collide with the autonomous mobile robot 400. As described herein, the safety computer and collision prevention feature implemented by the autonomous mobile robot 400 is directed at preventing contact with people or objects appearing in the path of the autonomous mobile robot 400 in the main direction of travel as well as avoiding dynamic obstacles that enter from the side into the main path and lead to a collision.

The safety zone 402 represents a non-contact object detection system that looks ahead of the autonomous mobile robot 400 and to the sides of the autonomous mobile robot 400. The primary object detection sensors associated with the navigation computer will be long-range so as to enable obstacle detection beyond a current stopping distance of the autonomous mobile robot 400. The safety verification computer of the autonomous mobile robot 400 may utilize short-range non-contact object detection with a 360 degree view around the autonomous mobile robot 400 to capture data for generating the safety zone 402. In embodiments, the short-range non-contact object detectors may be redundant numbers, types, or technologies as the object detection sensors. The safety computer may, upon identifying a breach of the safety zone 402, provide instructions to the propulsion components of the autonomous mobile robot 400 which causes the autonomous mobile robot 400 to stop before colliding with the detected object. With this configuration the autonomous mobile robot 400 will be stationary upon an incoming object 404 colliding with it. In embodiments, the safety zone 402 is shaped to accommodate the idea that the objects 404 are on a collision course with the autonomous mobile robot 400 but just out of view or hiding behind an obstacle.

The shape and size of the safety zone 402 will detect objects in a front 180 degree arc in front of the autonomous mobile robot 400 at a sufficient distance so as to safely stop the autonomous mobile robot before a collision occurs with the incoming objects 404. The safety computer may utilize a assumed max speed that the incoming objects 404 are traveling at, for example 1.7 m/s. While utilizing this assumption, the navigation computer is able to generate paths for avoiding actual detected objects while the safety verification computer accounts for potential incoming objects that allow the autonomous mobile robot to make progress towards completing its task while providing assured safety along the way. In embodiments, the size of the safety zone 402 imposes a lateral standoff distance from objects such as wells, pallets, people, carts, or other autonomous mobile robots in a facility/workspace. The stand-off distance varies with speed, so as the navigating environment becomes more crowded the emergent behavior of the autonomous mobile robot will be to slow down to reduce its required stand-off distance. Conversely, as the environment opens up, the autonomous mobile robot 400 will speed up. The other behavior the navigation computer enforces on the autonomous mobile robot 400 is to center a position of the autonomous mobile robot between nearby objects as it drives to maximize the standoff distance and its speed as it navigates past or through obstacles without breaking the safety zone 402.

Figure 5:
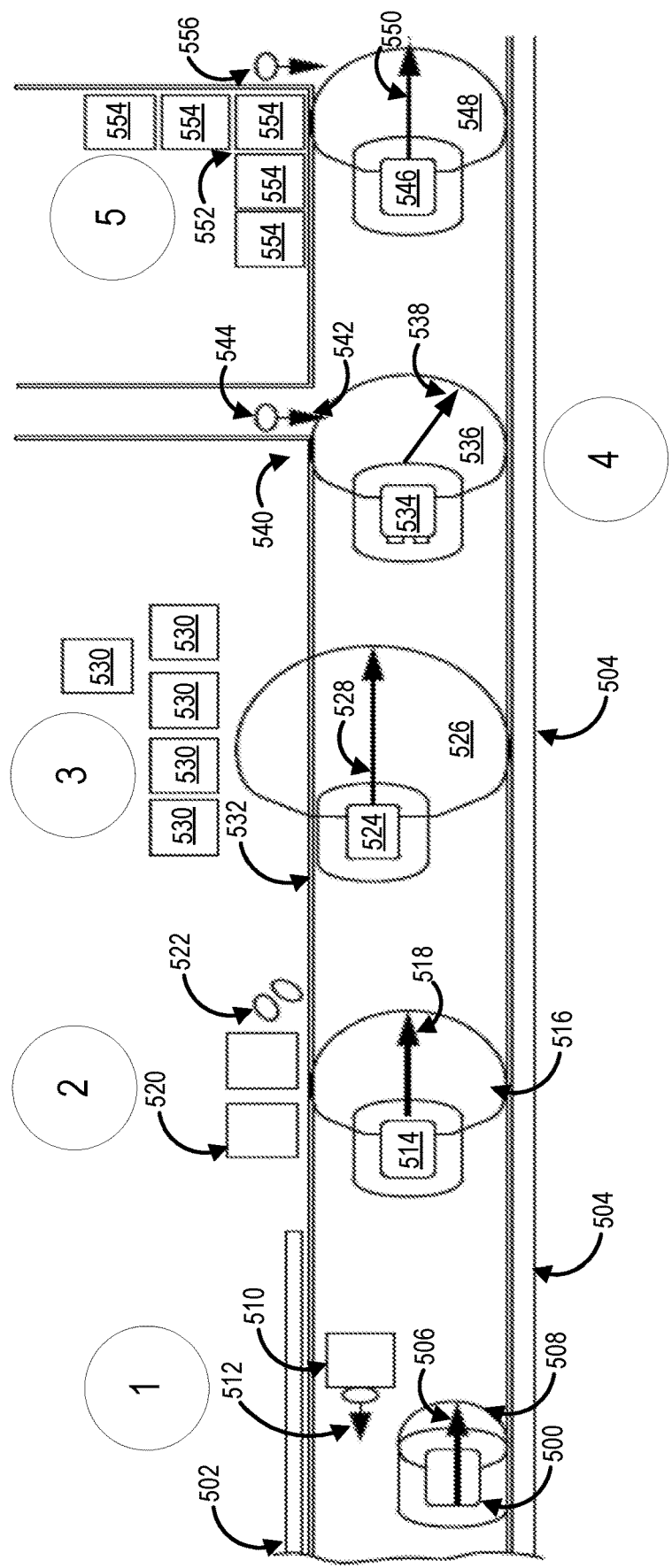
FIG. 5 illustrates a plurality of scenarios for preventing collision by an autonomous mobile robot with one or more obstacles while navigating a facility according to a collision prevention feature, in accordance with at least one embodiment.

FIG. 5 illustrates a plurality of scenarios for preventing collision by an autonomous mobile robot with one or more obstacles while navigating a facility according to a collision prevention feature, in accordance with at least one embodiment. The scenarios of FIG. 5 illustrates the dynamic shape and size of the safety zones generated and maintained by the safety verification system of an autonomous mobile robot implementing the collision prevention features disclosed herein. In scenario 1 (depicted with the encircled numeral 1), an autonomous mobile robot 500 travels in facility between a passage that includes a first wall 502 and a second wall 504. The arrow 506 represents the direction of the autonomous mobile robot 500 and 508 represents the current size and shape of an associated safety zone for the autonomous mobile robot 500 given the current speed and identification of the obstacle 510 that is being pulled by a human 512 in an opposite direction to that of 506. As illustrated in scenario 1, the autonomous mobile robot is capable of navigating past the obstacle 510 by reducing its speed and thereby decreasing the size of the safety zone 508. However, as described herein, the safety zone 508 is shaped and sized to respond to an erratic collision course by the object 510 or human 512 into the path of the autonomous mobile robot 500. Scenario 1 also illustrates the centering of the autonomous mobile robot 500 between the detected object 510 and barrier 504 given a standoff distance of the safety zone 508 and the physical dimensions of the space around the object 510 and barriers 504 and 502.

FIG. 5 also depicts scenario 2 (represented by the encircled numeral 2) that includes an autonomous mobile robot 514 with a safety zone 516 and directionality 518. In scenario 2, the safety zone 516 is shaped and sized according to the current speed of the autonomous mobile robot 514 and detection of nearby objects or lack thereof of objects around the autonomous mobile robot (i.e., within the local planning zone). Scenario 2 however does include one or more pallets or creates 520 and humans hiding behind the crates 522. As described herein, the safety zone 516 is sized and shaped to anticipate objects (i.e., humans 522) intercepting the path 518 of the autonomous mobile robot as it navigates a facility. As such, the standoff distance between the autonomous mobile robot 514 and the objects 520 and humans 522 is based on the speed and identification or lack of identification of objects within the local planning zone yet still large enough to allow the autonomous mobile robot 514 to cease moving upon the humans 522 breaching the safety zone. Again, scenario 2 illustrates the navigation computer providing instructions to the propulsion mechanisms that cause the autonomous mobile robot 514 to be centered between barrier 504 and a temporary barrier formed by the location of objects 520.

FIG. 5 also depicts scenario 3 (represented by the encircled numeral 3) that includes an autonomous mobile robot 524 with a safety zone 526 traveling in a direction 528. In scenario 3, the navigation computer may identify one or more objects 530 that are some distance from the autonomous mobile robot 524. As such, the navigation computer provides a local travel plan that centers the autonomous mobile robot between barrier 504 and an imaginary barrier formed by the objects 530. Thus, the barrier 532 that existed in scenario 2 does not exist for scenario 3. Further, as objects 530 to not form a blind spot, the navigation computer of the autonomous mobile robot 524 is able to utilize a higher speed thereby increasing the size and shape of the safety zone 526 thereby allowing an appropriate standoff distance for the autonomous mobile robot to come to a complete stop should an object penetrate the safety zone 526. Scenario 4 (represented by the encircled numeral 4) includes an autonomous mobile robot 534 with a safety zone 536 and directionality 538 as it navigates a facility or workspace. In scenario 4, an intersection 540 associated with high visibility is represented. As the intersection 540 provides good visibility for autonomous mobile robot 534, the autonomous mobile robot 534 is able to detect the oncoming 542 human 544.

In embodiments, the size and shape of the safety zone 536 is such that it accounts for the potential of an incoming 542 object (human 544). The size and shape of the safety zone 536 is determined based on a speed of the autonomous mobile robot 534 which is in turn modified by the new local travel path or plan represented by the directionality 538 veering away from human 544. Thus, in a scenario where the navigation computer of autonomous mobile robot 534 is unable to change directionality 538 and speed to avoid human 544, the safety sensors generating the safety zone 536 will detect the intrusion of human 544. Upon human 544 penetrating or otherwise intersecting with the safety zone 536, instructions will be provided by the safety verification system to the propulsion mechanisms of autonomous mobile robot 534 which cause the autonomous mobile robot 534 to be stationary prior to the human 544 colliding with it. In embodiments, the size and shape of the safety zone 536 and the speed determined by the navigation computer may be dynamically updated based on the presence or absence of a payload being moved by the autonomous mobile robot 534. FIG. 5 also depicts scenario 5 (represented by the encircled numeral 5) and includes an autonomous mobile robot 546 with safety zone 548 and with a directionality 550 as it navigates in a facility and/or workspace. Scenario 5 also illustrates a blind spot 552 formed by crates or objects 554 that obscures the presence of an incoming object (human 556). Similar to scenario 4, the size and shape of the safety zone 548 is determined based on a speed of the autonomous mobile robot 546 as well as an indication of a blind spot or gap in continuous wall by the obstacle detection sensors and navigation computer. Thus, upon human 556 penetrating or otherwise intersecting with the safety zone 548, instructions will be provided by the safety verification system to the propulsion mechanisms of autonomous mobile robot 546 which cause the autonomous mobile robot 546 to be stationary prior to the human 556 colliding with it.

Figure 6:
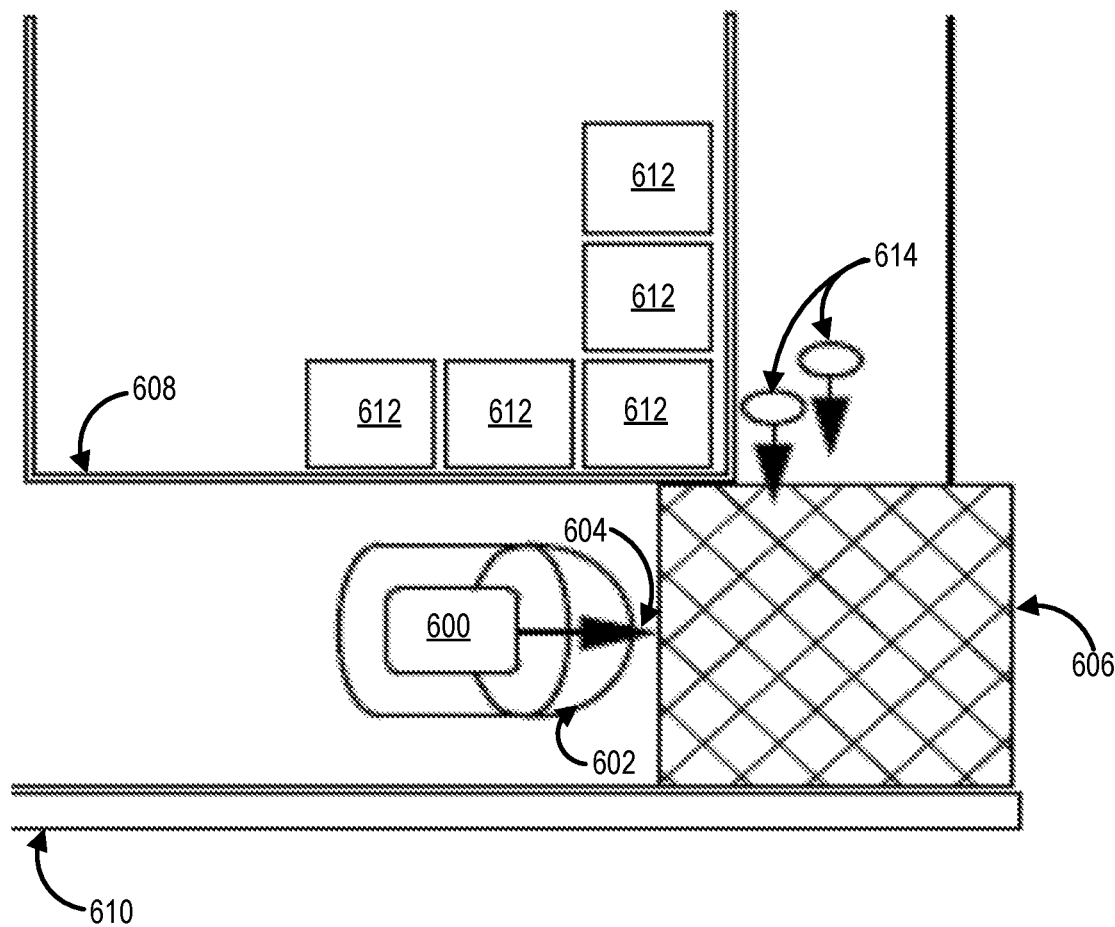
FIG. 6 illustrates an example scenario for preventing collision by an autonomous mobile robot with one or more obstacles within a particular area of a facility according to a collision prevention feature, in accordance with at least one embodiment.

FIG. 6 illustrates an example scenario for preventing collision by an autonomous mobile robot with one or more obstacles within a particular area of a facility according to a collision prevention feature, in accordance with at least one embodiment. FIG. 6 illustrates a scenario that includes an autonomous mobile robot 600 with a safety zone 602 and directionality 604 on a course to interact with a safe zone or slow down area 606 of a facility or workspace. FIG. 6 also depicts a passage formed by two barriers 608 and 610 as well as a blind spot formed by the objects 612 which obscure the presence of two incoming humans 614. The safe zone or slow down area 606 may be one or more portions of a facility that are associated with high traffic or congestion by objects navigating the facility at regular intervals. As such, the safe zone or slow down area 606 may be associated with one or more fiducial markers that are detectable by the objection detection sensors of the autonomous mobile robot 600. The identification of the fiducial markings may be utilized by the navigation computer of the autonomous mobile robot 600 to enforce a minimal speed or slower speed than that which is normally required given the obstacle detection sensor data. In the scenario illustrated in FIG. 6 the slower speed of the autonomous mobile robot 600 results in a smaller size and a certain shape of the safety zone 602 and is warranted given the presence of humans 614 and their given direction towards a path that may collide with autonomous mobile robot 600.

Figure 7:
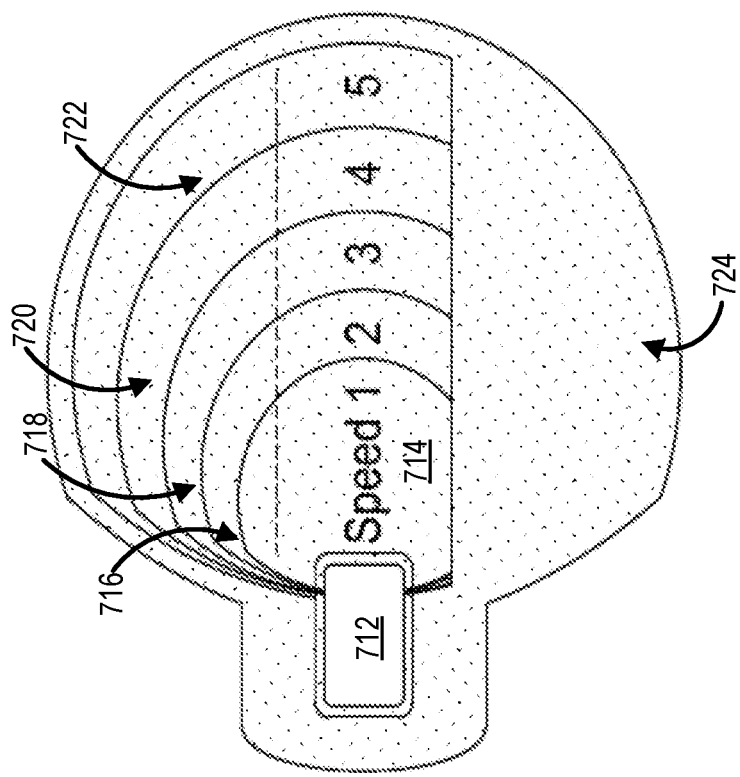
FIG. 7 illustrates example sizes and shapes for a safety zone projected around an autonomous mobile robot that changes based on identification of a safe zone of a facility and a speed of the autonomous mobile robot implementing the collision prevention feature, in accordance with at least one embodiment.
Figure 7:
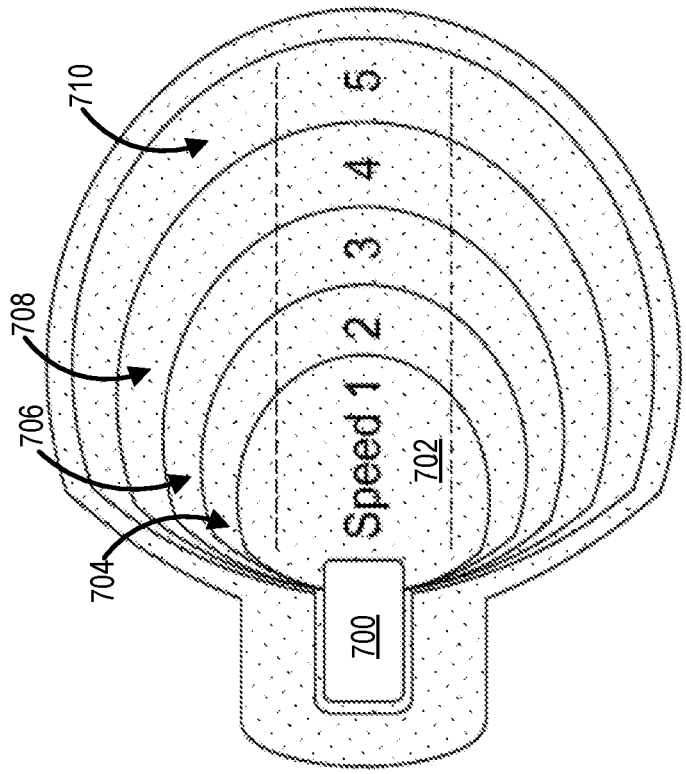

FIG. 7 illustrates example sizes and shapes for a safety zone projected around an autonomous mobile robot that changes based on identification of a safe zone of a facility and a speed of the autonomous mobile robot implementing the collision prevention feature, in accordance with at least one embodiment. FIG. 7 includes a representation of a default mode for an autonomous mobile robot 700 implementing the collision prevention features disclosed herein. The default mode includes a safety zone 702 that extends and takes a different shape based on the various speeds 704-710 around the autonomous mobile robot 700. As depicted in FIG. 7, the default mode's safety zone 702 covers at least a 180 degree arc projecting from the front facing of the autonomous mobile robot 700 to identify and detect incoming objects using all the safety sensors and/or object detection sensors of the autonomous mobile robot 700 while it navigates a facility.

FIG. 7 also illustrates a wall hugging mode for autonomous mobile robot 712 that includes a safe zone 714 that has a different shape and sizes to reflect the speeds 716-722 utilized by the autonomous mobile robot 712. As described herein, the size and shape of the safety zone 714 may be dynamically updated based on the current or given speed utilized by the autonomous mobile robot 712. As depicted in FIG. 7, the safety zone 714 has a different profile or size and shape with the safety zone 702 utilized by the autonomous mobile robot 700 utilizing a default mode. In wall hugging mode, the navigation computer and safety computer of the autonomous mobile robot 712 may be configured to filter or ignore a portion of the information detected by the safety sensors and/or object detection sensors of autonomous mobile robot 712 based on the identification of a continuous wall or safe wall in a facility. Similar to the identification of the safe zone or slow down area of the facility described in FIG. 6, a safe wall or continuous wall may be identified based on an associated fiducial marking or based on the sensor data obtained by the object detection sensors. The size and shape of the safety zone 714 is dynamically updated based on the information detected by the safety sensors and/or object detection sensors while filtering or ignoring a portion of the data provided by said sensors while in a vicinity of a safe wall and a different speed may be determined for the autonomous mobile robot 712 by the associated navigation computer given the presence of a safe wall and engaging of the wall hugging mode. The empty area 724 represents an area around the autonomous mobile robot 712 where data is being captured by corresponding safety sensors and object detection sensors but is filtered out or ignored by the navigation computer and/or safety computer to enable wall hugging mode for the autonomous mobile robot 712.

Figure 8:
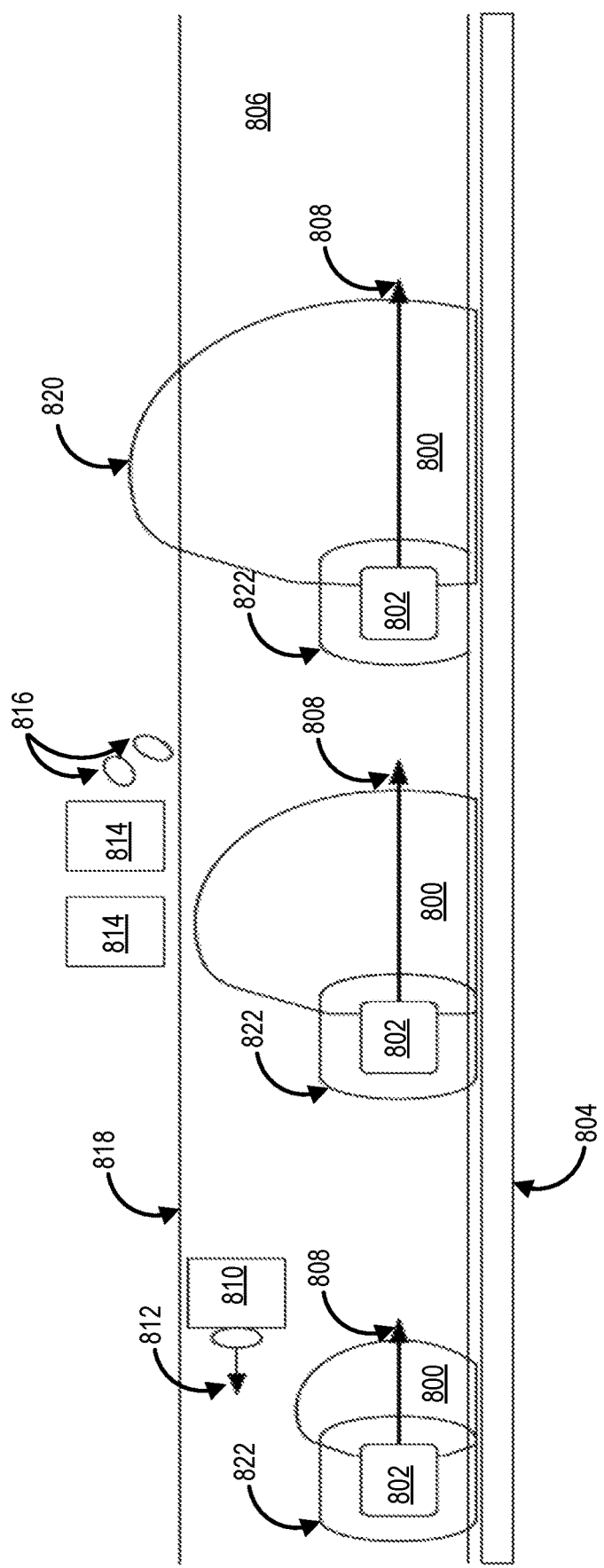
FIG. 8 illustrates example scenarios for preventing collision by an autonomous mobile robot with one or more obstacles while utilizing a safe zone of a facility according to a collision prevention feature, in accordance with at least one embodiment.

FIG. 8 illustrates example scenarios for preventing collision by an autonomous mobile robot with one or more obstacles while utilizing a safe zone of a facility according to a collision prevention feature, in accordance with at least one embodiment. FIG. 8, similar to FIG. 5, illustrates a scenario that depicts the dynamically updated shape and size of a safety zone 800 for an autonomous mobile robot 802 engaged in a wall hugging mode associated with a safe wall 804 of a facility. As the autonomous mobile robot 802 begins (starting from the left hand side of the figure) navigating a passage 806 that includes the safe wall 804 in a direction 808, the objection detection sensors identify an object 810 being pulled by a human in an opposite direction 812. The safety zone 800 illustrated in FIG. 8 represents the appropriate size and shape of the safety zone as generated by the safety computer when engaged in a wall hugging mode as a portion of the data detected by the safety sensors and object detection sensors are ignored or filtered out to represent that no incoming obstacles or objects can come from a direction associated with the safe wall 804. As such, the autonomous mobile robot 802 and navigation computer generate a local travel plan for navigating past object 810 with a given speed that is used, along with the indication of the safe wall 804, to appropriately size and shape the safety zone 800 by the safety computer.

As the scenario continues to the middle of the figure and passage 806, the autonomous mobile robot 802 is located some distance from one or more objects 814 which obscure the presence of humans 816. In embodiments, the obstacle detection sensors may identify objects 814 and thereby generate a standoff distance or opposite barrier 818 with which to utilize to place the autonomous mobile robot proximally close to the safe wall 804 and further from the objects 814 then if the autonomous mobile robot were engaged in the default mode (as represented in FIG. 5). As the navigation computer of the autonomous mobile robot 802 is able to utilize a higher speed, the safety zone 800 is appropriately larger and shaped in accordance with ignoring or filtering out a portion of the safety sensor data and/or object detection sensor data by utilizing a wall hugging mode. FIG. 8 also depicts an updated size and shape for the safety zone 800 as it navigates the passage 806 and passes the objects 814 and 816. At the end of the scenario depicted in FIG. 8 (right part of the FIG.) the shape and size of the safety zone 800 surpasses the opposite barrier 818 to account for the lack of detected objects which is in turn reflected by an increased speed for the local travel plan generated by the navigation computer of autonomous mobile robot 822. In FIG. 8, the buffer zone 822 is also maintained and generated by the safety computer of the autonomous mobile robot 802 as disclosed herein.

Figure 9:
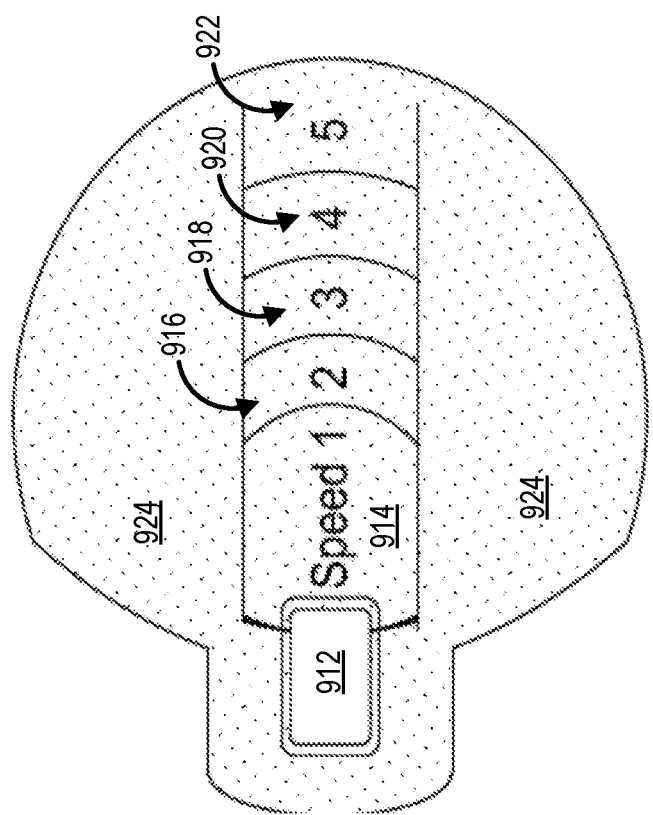
FIG. 9 illustrates example sizes and shapes for a safety zone projected around an autonomous mobile robot that changes based on identification of a safe zone of a facility and a speed of the autonomous mobile robot implementing the collision prevention feature, in accordance with at least one embodiment.
Figure 9:
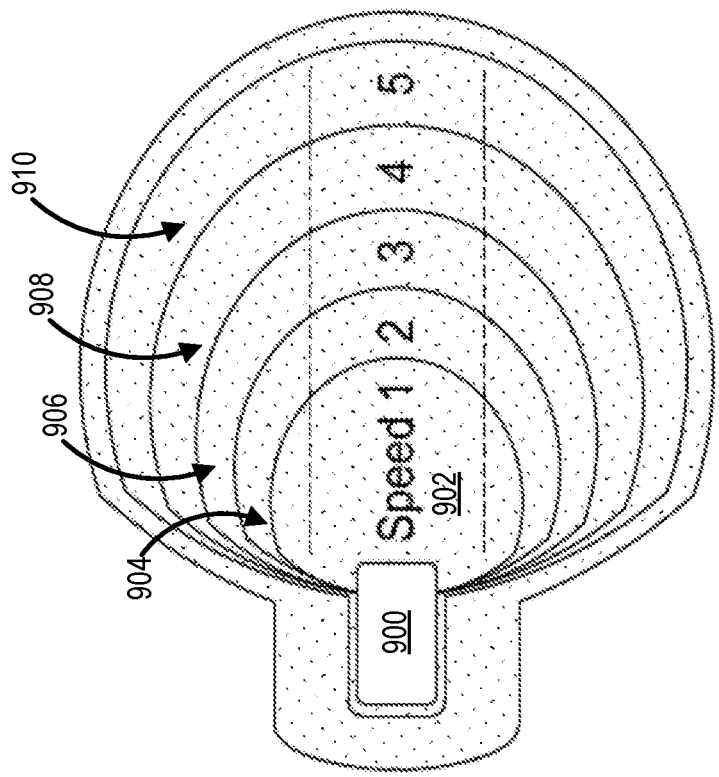

FIG. 9 illustrates example sizes and shapes for a safety zone projected around an autonomous mobile robot that changes based on identification of a safe zone of a facility and a speed of the autonomous mobile robot implementing the collision prevention feature, in accordance with at least one embodiment. FIG. 9 includes a representation of a default mode for an autonomous mobile robot 900 implementing the collision prevention features disclosed herein. The default mode includes a safety zone 902 that extends and takes a different shape based on the various speeds 904-910 around the autonomous mobile robot 900. As depicted in FIG. 9, the default mode's safety zone 902 covers at least a 180 degree arc projecting from the front facing of the autonomous mobile robot 900 to identify and detect incoming objects using all the safety sensors and/or object detection sensors of the autonomous mobile robot 900 while it navigates a facility.

FIG. 9 also illustrates a speed lane mode for autonomous mobile robot 912 that includes a safe zone 914 that has a different shape and sizes to reflect the speeds 916-922 utilized by the autonomous mobile robot 912. As described herein, the size and shape of the safety zone 914 may be dynamically updated based on the current or given speed utilized by the autonomous mobile robot 912. As depicted in FIG. 9, the safety zone 914 has a different profile or size and shape than that of the safety zone 902 utilized by the autonomous mobile robot 900 utilizing a default mode. In speed lane mode, a portion of the data detected by the safety sensors and/or object detection sensors of autonomous mobile robot 912 are ignored or filtered out based on the identification of one or more continuous walls or safe walls in a facility. Similar to the identification of the safe zone or slow down area of the facility described in FIG. 6, safe walls or continuous walls may be identified based on an associated fiducial marking or based on the sensor data obtained by the object detection sensors. The size and shape of the safety zone 914 is dynamically updated based on the data provided by the safety sensors and objection detection sensors that is not ignored or filtered out and a different speed may be determined for the autonomous mobile robot 912 by the associated navigation computer given the presence of a safe wall and engaging of the speed lane mode. The empty areas 924 represents an area around the autonomous mobile robot 912 where data is being captured by corresponding safety sensors and object detection sensors but is filtered out or ignored by the navigation computer and/or safety computer to enable speed lane mode for the autonomous mobile robot 912.

Figure 10:
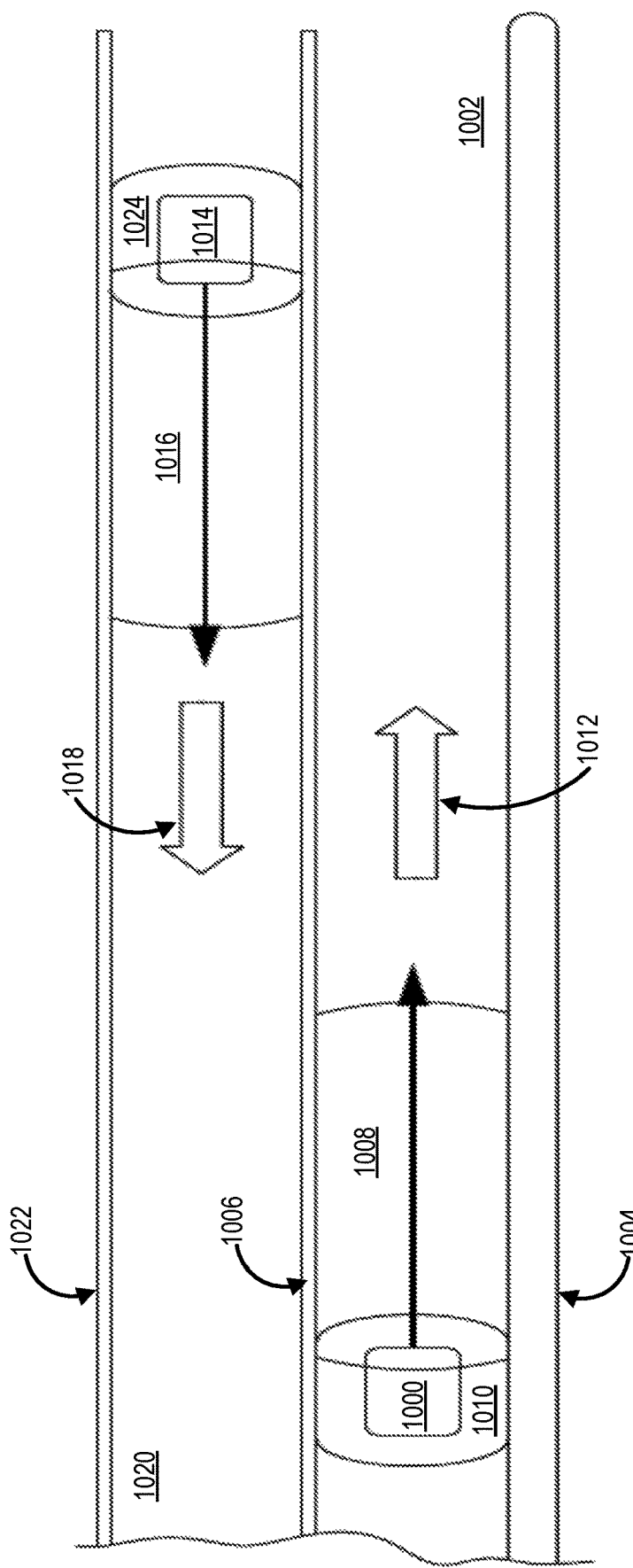
FIG. 10 illustrates an example scenario for preventing collision by an autonomous mobile robot with one or more obstacles while utilizing a safe zone of a facility according to a collision prevention feature, in accordance with at least one embodiment.

FIG. 10 illustrates an example scenario for preventing collision by an autonomous mobile robot with one or more obstacles while utilizing a safe zone of a facility according to a collision prevention feature, in accordance with at least one embodiment. FIG. 10 includes an autonomous mobile robot 1000 utilizing one passage 1002 that includes two barriers 1004 and 1006 that are associated with speed lane mode fiducial markings. The autonomous mobile robot 1000 has a safety zone 1008 that is of a size and shape that reflects the current speed of the autonomous mobile robot 1000 and the disabling of a portion of the object detection sensors and/or safety sensors corresponding to utilizing a speed lane mode. The autonomous mobile robot 1000 has a buffer zone 1010 and is traveling in a first direction 1012 in passage 1002. FIG. 10 also depicts an autonomous mobile robot 1014 with a safety zone 1016 of a size and shape that reflect the speed of the autonomous mobile robot 1014 and the disabling of a portion of the safety sensors and/or object detection sensors for autonomous mobile robot 1014 that corresponds to utilizing a speed lane mode. The autonomous mobile robot 1014 is illustrated as navigating in a second direction 1018 in passage 1020 between safe walls or barriers 1006 and 1022. The autonomous mobile robot 1014 also has a buffer zone 1024. As illustrated in FIG. 10, the safety zones 1008 and 1016 are of a similar size and shape as both autonomous mobile robots are utilizing speed lane modes and are navigating through passages that include two safety walls 1004/1006 or 1006/1022. As such, the size and shape of safety zones 1008 and 1016 do not intersect and allow for safe and continuous travel of autonomous mobile robots 1000 and 1014 in proximity to each other but in opposite or similar directions.

FIGS. 11-14 illustrate example flows for a collision prevention feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 11:
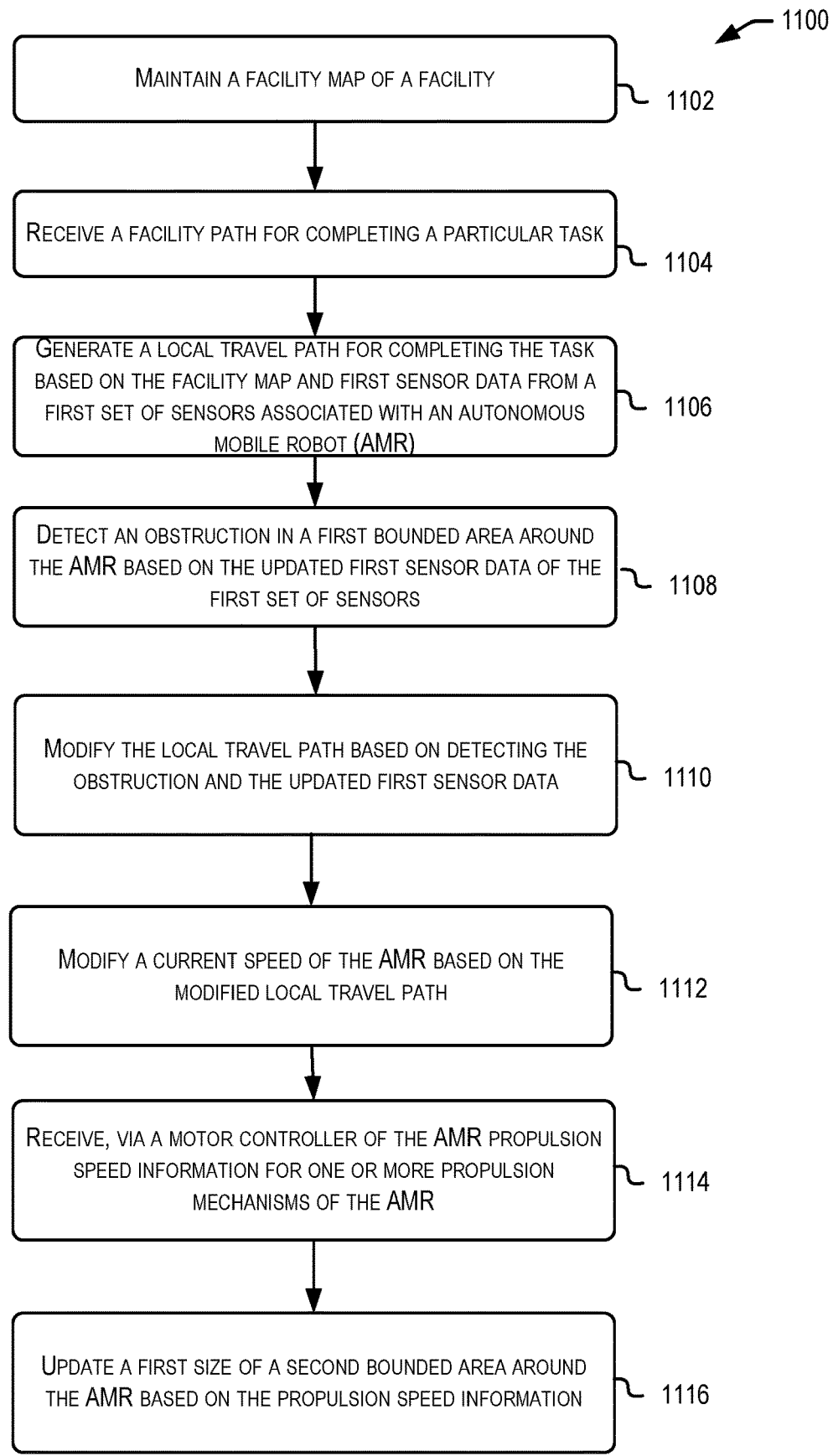
FIG. 11 illustrates a flow diagram of a collision prevention feature, in accordance with at least one embodiment.

In some examples, the fleet management computers 310 and/or the autonomous mobile robot 312 (e.g., utilizing at least one of the safety module 328/346 and the navigation module 326/344) shown in FIG. 3, may perform the processes 1100-1400 of FIGS. 11-14. In FIG. 11 the process 1100 may include maintaining a facility map of a facility at 1102. For example, a facility map may indicate general routes available to a autonomous mobile robot completing tasks in the facility, specific areas that are marked as high congestion or slow areas that enforce a certain speed, as well as the location of other autonomous mobile robots within the facility. In embodiments, an autonomous mobile robot may include a navigation computer that is configured to generate a local travel path for navigating the facility and completing a task. The navigation computer may be associated with a first set of sensors that capture first sensor data that may be utilized, by the navigation computer and/or autonomous mobile robot, to identify an obstruction in the local travel path and within the first bounded area in a first direction or facing of the autonomous mobile robot. In accordance with at least one embodiment, the local travel path may be a new path that deviates from a global path or general route communicated to the autonomous mobile robot by the fleet management computers. The autonomous mobile robot may include a safety verification computer that is configured to generate and maintain a second bounded area around the autonomous mobile robot based at least in part on second sensor data captured by a second set of sensors associated with the autonomous mobile robot and, speed information from one or more propulsion mechanisms of the autonomous mobile robot. In embodiments, the safety verification computer may be configured to instruct the propulsion mechanisms to cease propulsion of the autonomous mobile robot based on the second sensor data identifying the obstruction within the second bounded area. The safety verification computer may dynamically adjust the size and shape of the second bounded area based on updated speed information and/or other data such as data from external sensors or indications of load bearing by the autonomous mobile robot or a shape of the autonomous mobile robot. The autonomous mobile robot may include a motor controller configured to control propulsion of the autonomous mobile robot via the one or more propulsion mechanisms associated with the autonomous mobile robot.

The process 1100 may include receiving a facility path for completing a particular task at 1104. In embodiments, the fleet management computers may transmit a facility path or global path to the autonomous mobile robot for completing the task. The facility path may indicate a general route to navigate the facility while completing the assigned task. As described herein, the autonomous mobile robot generates its own local travel path that may refer or utilize information included in the facility path but is not constrained to only the route identified in the facility path by the fleet management computers. Instead, the autonomous mobile robot, using data from the first set of sensors and the second set of sensors, may identify or generate a new path for completing the task that may be more efficient. The process 1100 may include generating a local travel path for completing the task based at least in part on the facility map and first sensor data from the first set of sensors at 1106. The process 1100 may include detecting an obstruction in a first bounded area around the autonomous mobile robot based on updated first sensor data from the first set of sensors at 1108. For example, the first set of sensors may identify that an object has penetrated the first bounded area around the autonomous mobile robot, either by the autonomous mobile robot moving towards the object or the object moving towards the autonomous mobile robot. In embodiments, based on the number and type of sensors included in the first set of sensors, the first sensor data may identify whether the object is stationary, non-stationary (moving), and in what direction the object is moving (directionality), as well as speed of the object if it is moving.

The process 1100 may include modifying the local travel path based on detecting the obstruction and the updated first sensor data at 1110. In embodiments, the navigation computer and/or autonomous mobile robot may utilize the first sensor data to identify one or more dimensions for a physical space around an object, a given size of the second bounded area based on a given speed to navigate around or by the object, and whether the object is stationary or mobile, to modify the local travel path. The local travel path may identify a center position for the autonomous mobile robot to place the autonomous mobile robot and the second bounded area around the object within a center of a path for navigating around or by one or more objects and/or obstacles. The process 1100 may include modifying a current speed of the autonomous mobile robot based at least in part on the modified local travel path at 1112. In embodiments, the navigation computer may provide instructions to the motor controller for modifying the propulsion mechanisms that adjust the speed of the autonomous mobile robot. The process 1100 may include receiving, via the motor controller of the autonomous mobile robot, propulsion speed information for one or more propulsion mechanisms of the autonomous mobile robot at 1114. In embodiments, the safety verification computer may receive the speed information from the motor controller or may directly interface with the propulsion mechanisms or use sensors associated with the propulsion mechanisms to obtain the speed information of the propulsion mechanisms.

The process 1100 may conclude at 1116 by updating a size of the second bounded area around the autonomous mobile robot based on the speed information for the propulsion mechanisms of the autonomous mobile robot. As described herein, the size and shape of the second bounded area (e.g., the safety zone) of the autonomous mobile robot may dynamically update based on the speed of the autonomous mobile robot as controlled by the navigation computer. The autonomous mobile robot is enabled to identify and attempt new local travel paths for avoiding obstacles and/or objects within the facility while navigating the facility to complete a task with a certified safety fail safe implemented by the safety verification computer. The second bounded area is configured to crease propulsion of the autonomous mobile robot upon detecting a penetration by an object within the second bounded area. However, until this occurs, the autonomous mobile robot is configured to navigate around obstacles using a slower speed and thereby reducing the size of the second bounded area which results in the autonomous mobile robot navigating around obstacles rather than stopping movement upon identifying an obstacle. In embodiments, a facing or direction of the autonomous mobile robot may be identified in the updated or modified local travel path. Instructions may be provided to the motor controller which identifies a steering and propulsion for the propulsion mechanisms to utilize to enable the autonomous mobile robot to navigate the facility, and around an object, according to the updated or modified local travel path.

Figure 12:
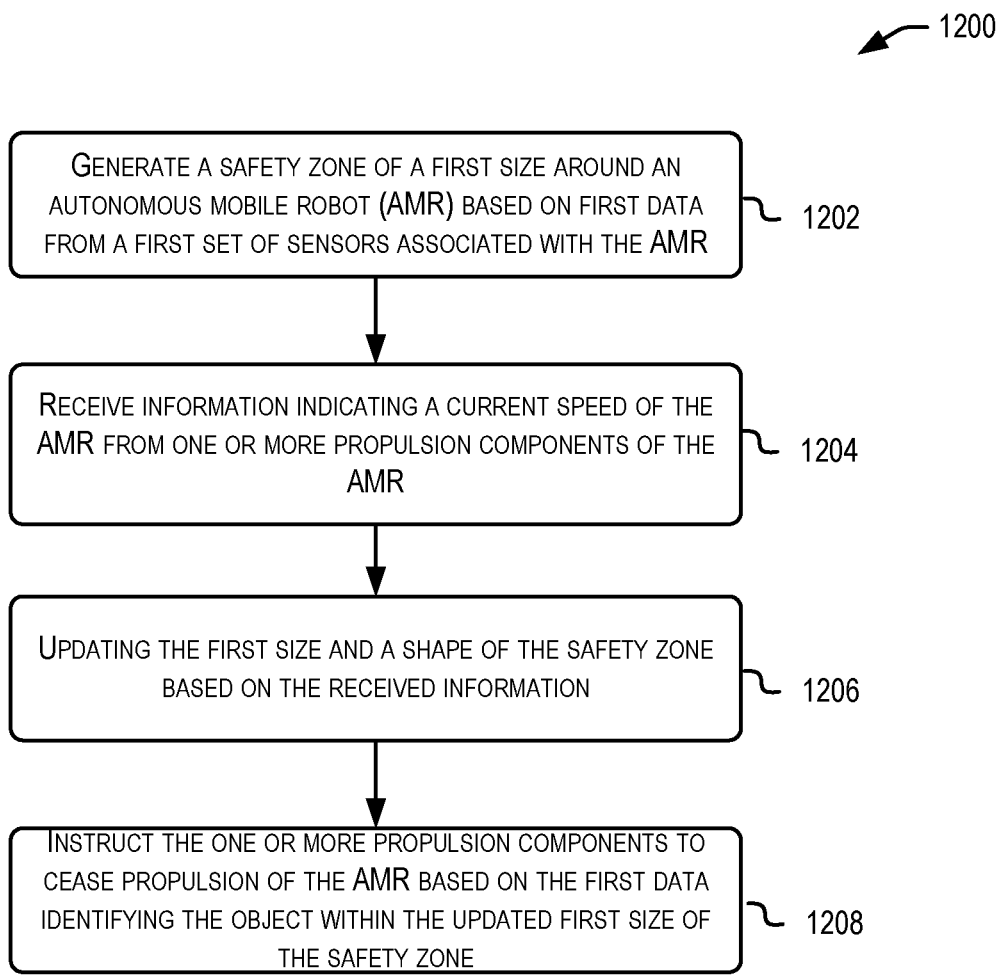
FIG. 12 illustrates a flow diagram of a collision prevention feature, in accordance with at least one embodiment.

In FIG. 12 the process 1200 may begin by generating a safety zone of a first size around an autonomous mobile robot based at least in part on first sensor data from a first set of sensors associated with the autonomous mobile robot at 1202. In embodiments, the safety zone may represent a certified fail safe for a navigation computer or module of an autonomous mobile robot that is configured to cease propulsion of the autonomous mobile robot upon identifying, using the first sensor data, that an object has penetrated or been detected within the safety zone. In embodiments, a size and shape of the safety zone may be limited by the placement and sensing capabilities of the type of sensors included in the first set of sensors. For example, the safety zone may be limited in size or projected around the autonomous mobile robot up to a functional range of the sensors utilized in the first set of sensors. The process 1200 may include receiving information indicating a current speed of the autonomous mobile robot from one or more propulsion components of the autonomous mobile robot at 1204.

The process 1200 may include updating the first size and a shape of the safety zone based at least in part on the received information at 1206. In embodiments, the size and shape of the safety zone may be dynamically updated based on a speed of the autonomous mobile robot as indicated by the information derived from the propulsion components/mechanisms of the autonomous mobile robots. In some embodiments, the size and shape of the safety zone may be updated to reflect the physical dimensions of the space around the autonomous mobile robot. For example, the size and shape may be updated such that an edge of the safety zone is close to a wall or stationary object such that the autonomous mobile robot may continue to navigate the facility and not cause the autonomous mobile robot to cease propulsion. In embodiments, the safety zone may be dynamically updated based on other data such as data from external sensors and or data identifying an obstacle or object as mobile or not stationary as opposed to stationary. The process 1200 may conclude at 1208 by instructing the one or more propulsion components to cease propulsion of the autonomous mobile robot based at least in part on the first data identifying an object within or has penetrated the updated first size of the safety zone. As described herein, the safety zone or area around or projected in a direction from the autonomous mobile robot acts as a certified fail safe to paths, speed, and directions identified by a navigation computer of the autonomous mobile robot. As such, the safety verification computer in conjunction with the safety zone can override any instructions to the propulsion mechanisms of the autonomous mobile robot to cease propulsion of the autonomous mobile robot and avoid a collision by the autonomous mobile robot with an object. The object may still strike the autonomous mobile robot but by the time it strikes the autonomous mobile robot the autonomous mobile robot will be stationary. In embodiments, the safety verification computer can also act as a failsafe for uses cases where the navigation computer is malfunctioning or failing to communicate with the safety computer and/or the autonomous mobile robot/fleet computers of a facility.

Figure 13:
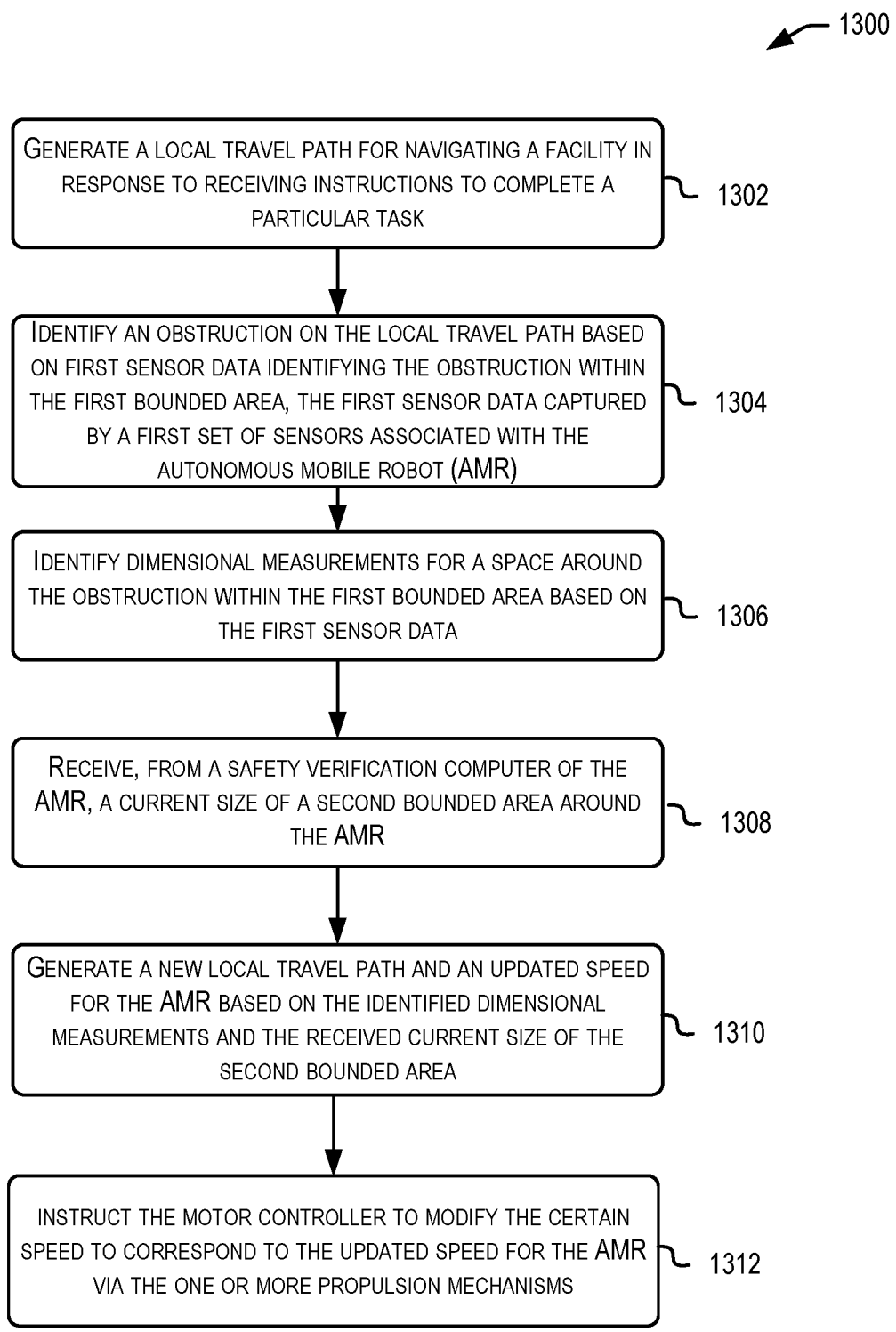
FIG. 13 illustrates a flow diagram of a collision prevention feature, in accordance with at least one embodiment.

In FIG. 13 the process 1300 may begin by generating a local travel path for navigating a facility in response to receiving instructions to complete a particular task at 1302. In embodiments, the local travel path may include instructions for steering and speed for propulsions mechanisms of the autonomous mobile robot to utilize while navigating a facility to complete a task. The process 1300 may include identifying an obstruction on the local travel path and within the first bounded area of the autonomous mobile robot based at least in part on first sensor data of the first set of sensors associated with the autonomous mobile robot at 1304. The process 1300 may include identifying dimensional measurements for a space around the obstruction within the first bounded area based at least in part on the first sensor data at 1306. For example, the first sensors may identify the physical dimensions around an object but within given constraints such as the identification of one or more walls or barriers around the object and within the sensor capabilities range. In some embodiments, the physical dimensions around the object may be utilized to generate instructions for centering or placing the autonomous mobile robot within a center position with respect to the identified object in the local travel path and one or more barriers or walls.

The process 1300 may include receiving, from a safety verification computer of the autonomous mobile robot, a current size of a second bounded area around the autonomous mobile robot at 1308. In embodiments, the second bounded area is generated based on second sensor data from a second set of sensors associated with the autonomous mobile robot. The safety verification computer may be configured to cease propulsion of the autonomous mobile robot upon identifying an object or obstruction within the second bounded area that overrides or vetoes instructions to the propulsion components of the autonomous mobile robot that are provided by a navigation computer to a motor controller of the autonomous mobile robot. In accordance with at least one embodiment, the size of the second bounded area is less than the first bounded area. The process 1300 may include generating a new local travel path and an updated speed for the autonomous mobile robot to utilize while navigating the facility to complete the task based at least in part on the identified dimensional measurements and the received current size of the second bounded area at 1310. The process 1300 may conclude at 1312 by instructing the motor controller of the autonomous mobile robot to modify the speed to correspond to the current speed as indicated by the new local travel path for the autonomous mobile robot to utilize via the propulsion mechanisms/components. In embodiments, the safety verification computer may update the size of the second bounded are based on the updated speed for the autonomous mobile robot as indicated in the new local travel path. In some embodiments, generating the new local travel path includes using one or more speed profiles that are associated with the identified object within the first bounded area being stationary or mobile. For example, one speed profile may utilize a faster speed if the detected object is stationary while another speed profile may utilize a slower speed if the detected object is not stationary or mobile.

Figure 14:
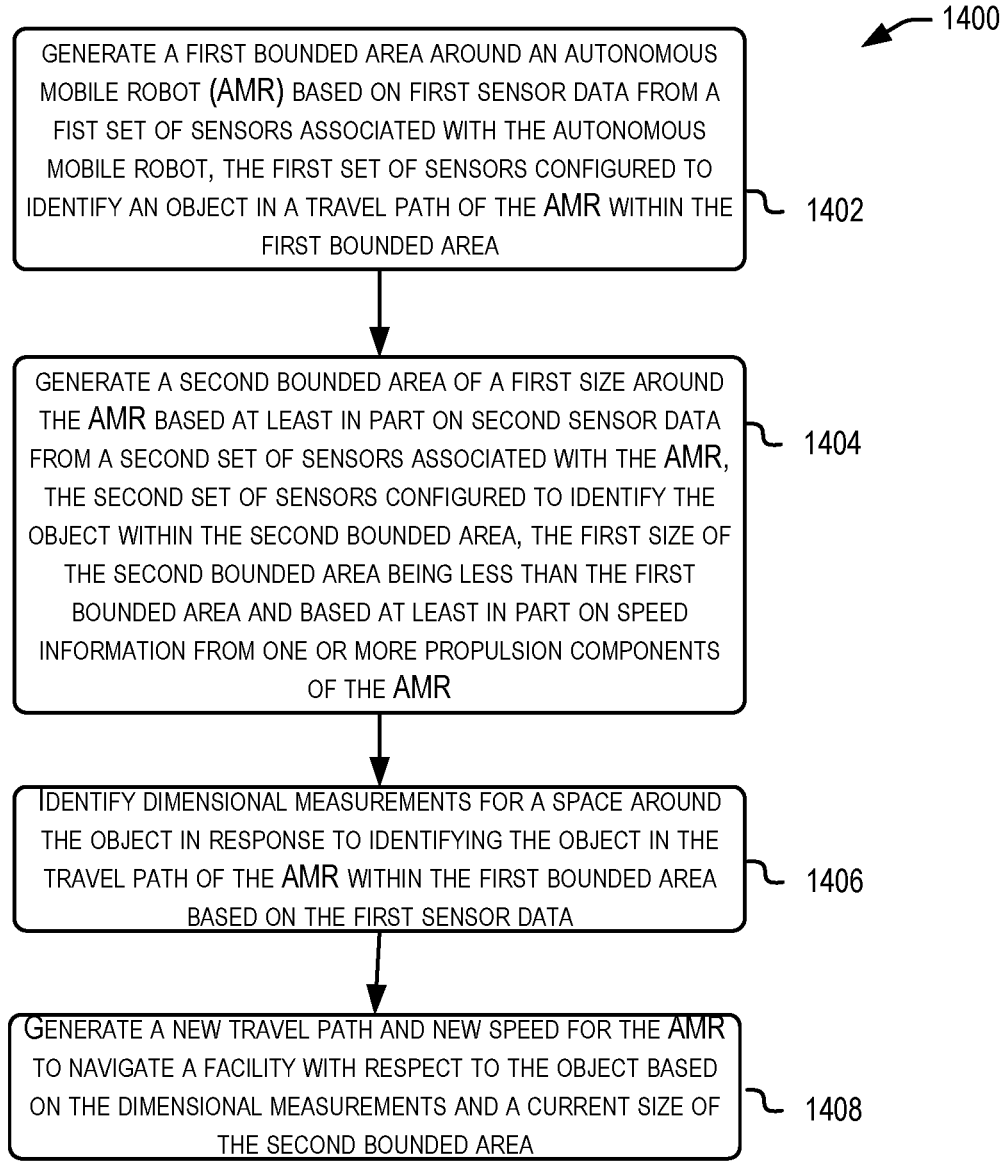
FIG. 14 illustrates a flow diagram of a collision prevention feature, in accordance with at least one embodiment.

In FIG. 14 the process 1400 may begin by generating a first bounded area around an autonomous mobile robot based on first sensor data from a first set of sensors associated with the autonomous mobile robot at 1402. The first set of sensors may be configured to identify an object in a travel path and within the first bounded area of the autonomous mobile robot using the first sensor data. In embodiments, the first set of sensors may be configured to identify a fiducial marking or other type of detectable marking associated with a door, a gap, or some other caution area where there is a high probability of traffic by humans and/or other autonomous mobile robots or poor visibility due to the design or layout of a facility or the placement of certain objects that generate a poor visibility situation. In accordance with at least one embodiment, upon the first set of sensors identifying the fiducial marking, instructions may be provided to the propulsion mechanism of the autonomous mobile robot to reduce a current speed which will in turn modify the size and shape of the corresponding safety zone, generated and maintained by the safety verification computer, until the fiducial marking is no longer detected. By utilizing such a system the autonomous mobile robots can utilize local travel paths that may pass through or by these caution areas without completely stopping or generating a path that is less efficient by completely avoiding such areas. In accordance with at least one embodiment, the identification of a caution area associated with a door, gap, or other intersection with poor visibility of oncoming objects or high likelihood of traffic may be identified by the navigation computer of an autonomous mobile robot based on utilizing a facility map. For example, an autonomous mobile robot may maintain and update a facility map that includes locations of the caution areas associated with doors, gaps, and high traffic. The autonomous mobile robot may utilize geolocation methods to determine a current location of itself and cross reference the current location of itself with a location of said caution areas within a facility to begin reducing speed of the autonomous mobile robot upon being within a certain distance from the caution area. The process 1400 may include generating a second bounded area of a first size around the autonomous mobile robot based at least in part on second sensor data from a second set of sensors associated with the autonomous mobile robot and speed information of one or more propulsion mechanisms of the autonomous mobile robot at 1404. In embodiments, the second set of sensors is configured to identify an object within the second bounded area and override any propulsion instructions from the navigation computer to the motor controller thereby ceasing propulsion of the autonomous mobile robot.

The process 1400 may include identifying dimensional measurements for a space around the object in response to identifying the object in the travel path of the autonomous mobile robot within the first bounded area based on the first sensor data at 1406. In some embodiments, a set of sensors associated with the autonomous mobile robot, such as contact sensors, may be configured to identify a wet surface or non-dry surface. The navigation computer may utilize the data from the contact sensors to generate new travel paths to avoid spills or wet surfaces that may cause the autonomous mobile robot to malfunction with regard to speed or directionality. In some embodiments, propulsion component sensors may be configured to detect wheel slippage or other malfunctions of the propulsion components that are associated with wet surfaces or non-dry surfaces and provide the information to the navigation computer of the autonomous mobile robot. Upon receiving such information the navigation computer may determine a new local travel path for moving out of a spill or non-dry surface or avoiding an area that is causing the propulsion mechanisms to malfunction. In some embodiments, the autonomous mobile robot may identify a location of a detected object within the first bounded area and compare the location of the detected object with the location of non-threatening or non-deviating path objects maintained in a facility map of a facility (e.g., speed bumps). The process 1400 may conclude at 1408 by generating a new travel path and new speed for the autonomous mobile robot to navigate a facility with respect to the detected object based on the dimensional measurements and a current size of the second bounded area.

Figure 15:
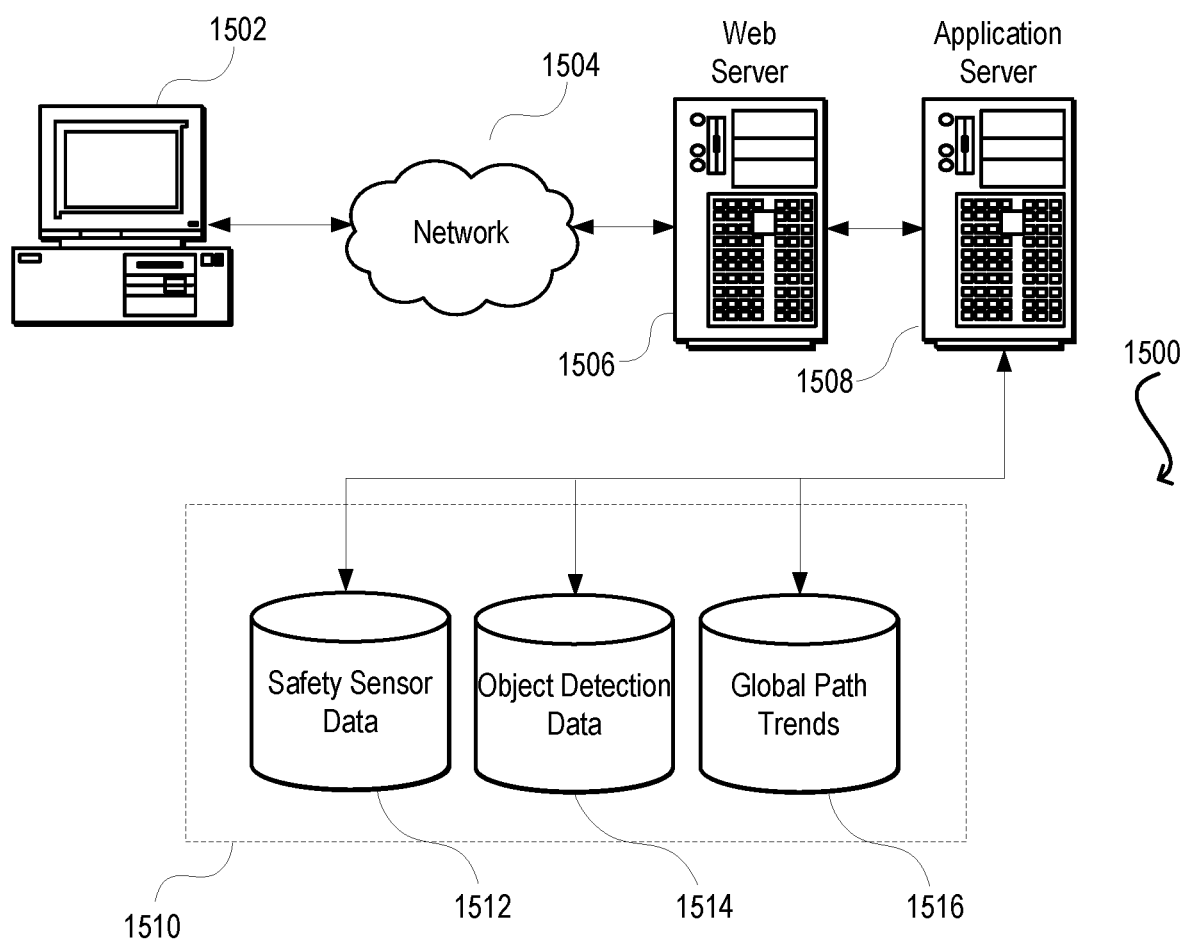
FIG. 15 illustrates an environment in which various features can be implemented, in accordance with at least one embodiment.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing information which can be used by modules described herein, such as safety sensor data 1512 that can be utilized to track a number of obstacles or objects that have penetrated a safety zone for a given autonomous mobile robot, object detection data 1514 that can be utilized to identify segments or areas of a facility with obstacles or objects and classify the objects or obstacles as stationary or non-stationary, and/or global path trends 1516 that can be utilized to identify global path trends that are based on historical paths generated and utilized by other autonomous mobile robots within a facility at some previous time point. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An autonomous mobile robot, comprising:
   one or more propulsion mechanisms;
   a motor controller configured to:
      control propulsion of the autonomous mobile robot at a commanded speed via the one or more propulsion mechanisms based on instructions from one or more of a navigation computer and a safety verification computer that are each part of the autonomous mobile robot and separate from the motor controller and each other,
      track speed information of the autonomous mobile robot, and
      transmit the speed information to the navigation computer and the safety verification computer;
   a first set of sensors configured to collect first sensor data; and
   a second set of sensors configured to collect second sensor data;
   wherein the navigation computer is configured to:
      receive instructions to complete a particular task of one or more tasks within a facility where the autonomous mobile robot is placed,
      detect an obstruction of the autonomous mobile robot based at least in part on the first sensor data and the instructions to complete the particular task,
      generate a local travel path for navigating, by the autonomous mobile robot, the facility while executing the particular task based at least in part on the first sensor data,
      maintain first information regarding a first bounded area of a first size in a first direction from the autonomous mobile robot along the local travel path based at least in part on the first sensor data,
      determine whether the obstruction is identified within the first bounded area and whether the obstruction is stationary or not stationary based on the first sensor data,
      whenever the obstruction is identified within the first bounded area, identify dimensional measurements for a space around the obstruction within the first bounded area based at least in part on the first sensor data,
      select a particular speed profile from one or more stored speed profiles based on whether or not the obstruction is identified as stationary or not stationary and the speed information received from the motor controller;
      receive from the safety verification computer a current size that corresponds to a second size of a second bounded area,
      generate a new local travel path, instructions for a portion of the first set of sensors, and an updated commanded speed for the autonomous mobile robot based at least in part on the dimensional measurements for the space, the current size of the second bounded area, and the particular speed profile, wherein the updated commanded speed corresponds to the particular speed profile, and wherein the instructions are configured to disable at least a portion of the first set of sensors based at least in part on the particular speed profile, and
      instruct the motor controller to modify the commanded speed to correspond to the updated commanded speed for the autonomous mobile robot via the one or more propulsion mechanisms, while traveling along the new local travel path; and
   wherein the safety verification computer is configured to:
      maintain second information regarding the second bounded area of the second size in the first direction from the autonomous mobile robot along the local travel path based at least in part on the second sensor data and the speed information received from the motor controller,
      transmit the current size that corresponds to the second size of the second bounded area to the navigation computer, determine whether the obstruction is identified within the second bounded area based on the second sensor data, and instruct the one or more propulsion mechanisms via the motor controller to cease propulsion of the autonomous mobile robot whenever the obstruction is identified within the second bounded area.

2. The autonomous mobile robot of claim 1, wherein the safety verification computer is further configured to update the second size of the second bounded area in the first direction based at least in part on the speed information received from the motor controller whenever the updated commanded speed is sent from the navigation computer to the motor controller.

3. The autonomous mobile robot of claim 1, wherein the second size of the second bounded area is less than the first size of the first bounded area.

4. The autonomous mobile robot of claim 1, wherein generating the new local travel path comprises the navigation computer identifying a center position for the autonomous mobile robot with respect to the obstruction and the dimensional measurements for the space.

5. The autonomous mobile robot of claim 4, wherein the navigation computer identifying the center position for the autonomous mobile robot with respect to the obstruction and the dimensional measurements for the space is further based at least in part on physical dimensions of an item being moved by the autonomous mobile robot during execution of the particular task.

* * * * *